US012583509B1

(12) United States Patent
Johnson

(10) Patent No.: US 12,583,509 B1
(45) Date of Patent: Mar. 24, 2026

(54) ASSISTED STEERING APPARATUS AND ASSOCIATED SYSTEMS AND METHODS

(71) Applicant: Ag Leader Technology, Ames, IA (US)

(72) Inventor: Brett Johnson, Ames, IA (US)

(73) Assignee: Ag Leader Technology, Ames, IA (US)

( * ) Notice: Subject to any disclaimer, the term of this patent is extended or adjusted under 35 U.S.C. 154(b) by 716 days.

(21) Appl. No.: 17/323,649

(22) Filed: May 18, 2021

Related U.S. Application Data

(60) Provisional application No. 63/026,208, filed on May 18, 2020.

(51) Int. Cl.
B62D 5/04 (2006.01)

(52) U.S. Cl.
CPC ......... B62D 5/0406 (2013.01); B62D 5/0442 (2013.01)

(58) Field of Classification Search
CPC ............................ B62D 5/0406; B62D 5/0442
See application file for complete search history.

(56) References Cited

U.S. PATENT DOCUMENTS

| | | | |
|---|---|---|---|
| 4,077,651 A | 3/1978 | Steinbach et al. | |
| 4,155,417 A | 5/1979 | Ziems | |
| 4,166,349 A | 9/1979 | Coenenberg | |
| 4,197,690 A | 4/1980 | Eistert | |
| 4,319,643 A | 3/1982 | Carter et al. | |
| 4,482,960 A | 11/1984 | Pryor | |
| 4,508,176 A | 4/1985 | Wiegardt | |
| 4,967,362 A | 10/1990 | Schutten | |
| 5,143,159 A | 9/1992 | Young | |
| 5,240,079 A | 8/1993 | Schmidt | |
| 5,253,172 A | 10/1993 | Ito | |
| 5,264,709 A | 11/1993 | Kamimura | |

(Continued)

FOREIGN PATENT DOCUMENTS

| | | |
|---|---|---|
| AU | 2016287397 B2 | 6/2016 |
| CN | 108362267 A | 8/2018 |

(Continued)

OTHER PUBLICATIONS

Mulakala, "Measurement Accuracy of the DJI Phantom 4 RTK & Photogrammetry", , pp. 1-18, Publisher: DroneDeploy.

(Continued)

*Primary Examiner* — Valentin Neacsu
*Assistant Examiner* — Michael R Stabley
(74) *Attorney, Agent, or Firm* — DENTONS DAVIS BROWN PC; Matthew Warner-Blankenship; Kassandra Ricklefs

(57) ABSTRACT

The disclosure is related to an assisted steering unit. In various implementations the assisted steering unit includes a motor drive unit and a ring assembly constructed and arranged to couple to and rotate a steering wheel. The assisted steering unit may include a ring assembly where the ring assembly includes a housing, a ring gear disposed within the housing, an anti-rotation pin operatively engaged with the housing. The assisted steering unit may also include a motor drive unit (MDU) including a motor and a drive gear rotatably engaged with the motor. The ring assembly and motor drive unit are constructed and arranged to be releasably engaged to each other.

20 Claims, 22 Drawing Sheets

(56)                  References Cited

U.S. PATENT DOCUMENTS

| | | | |
|---|---|---|---|
| 5,279,068 A | 1/1994 | Rees et al. | |
| 5,471,391 A | 11/1995 | Gudat et al. | |
| 5,585,626 A | 12/1996 | Beck | |
| 5,646,844 A | 7/1997 | Gudat et al. | |
| 5,837,997 A | 11/1998 | Beck et al. | |
| 5,995,902 A | 11/1999 | Monson | |
| 6,058,343 A | 5/2000 | Orbach | |
| 6,089,344 A | 7/2000 | Baughn | |
| 6,198,992 B1 | 3/2001 | Winslow | |
| 6,236,936 B1 | 5/2001 | Berstis et al. | |
| 6,275,771 B1 | 8/2001 | Berstis et al. | |
| 6,338,023 B1 | 1/2002 | Bourgeois | |
| 6,463,374 B1 | 10/2002 | Keller | |
| 6,484,078 B1 | 11/2002 | Kageyama | |
| 6,490,539 B1 | 12/2002 | Ukai | |
| 6,501,422 B1 | 12/2002 | Nichols | |
| 6,529,823 B1 | 3/2003 | Berstis et al. | |
| 6,686,951 B1 | 2/2004 | Dickson | |
| 6,732,024 B2 | 5/2004 | Rekow | |
| 6,741,921 B2 | 5/2004 | Cohen et al. | |
| 6,856,879 B2 | 2/2005 | Arakawa et al. | |
| 6,917,300 B2 | 7/2005 | Allen | |
| 6,943,824 B2 | 9/2005 | Alexia et al. | |
| 6,946,824 B2 | 9/2005 | Waizman et al. | |
| 7,171,769 B2 | 2/2007 | Schultz | |
| 7,256,388 B2 | 8/2007 | Eglington et al. | |
| 7,349,779 B2 * | 3/2008 | Nelson | B62D 1/02 |
| | | | 701/41 |
| 7,350,806 B2 * | 4/2008 | Ridolfi | B60R 21/2032 |
| | | | 280/771 |
| 7,360,623 B2 | 4/2008 | Green et al. | |
| 7,369,924 B2 | 5/2008 | Han | |
| 7,628,239 B1 * | 12/2009 | Louie | B62D 1/00 |
| | | | 701/2 |
| 7,648,004 B1 * | 1/2010 | Larouche | B62D 1/00 |
| | | | 180/443 |
| 7,734,386 B2 | 6/2010 | DelNero et al. | |
| 7,777,615 B2 | 8/2010 | Okuda | |
| 8,078,338 B2 | 12/2011 | Pack | |
| 8,126,620 B2 | 2/2012 | Ringwald et al. | |
| 8,180,514 B2 | 5/2012 | Kaprielian et al. | |
| 8,195,342 B2 | 6/2012 | Anderson | |
| 8,214,111 B2 | 7/2012 | Heiniger | |
| 8,392,065 B2 | 3/2013 | Tolstedt | |
| 8,437,901 B2 | 5/2013 | Anderson | |
| 8,494,726 B2 | 7/2013 | Peake | |
| 8,589,013 B2 | 11/2013 | Robotics | |
| 8,605,947 B2 | 12/2013 | Zhang | |
| 8,634,993 B2 | 1/2014 | McClure | |
| 8,639,408 B2 | 1/2014 | Anderson | |
| 8,706,394 B2 | 4/2014 | Trepagnier et al. | |
| 8,781,658 B2 | 7/2014 | Simonini | |
| 8,781,685 B2 | 7/2014 | McClure | |
| 8,814,640 B2 | 8/2014 | Behnke et al. | |
| 8,892,308 B2 * | 11/2014 | Davis | B62D 1/286 |
| | | | 701/41 |
| 9,002,565 B2 | 4/2015 | Jones et al. | |
| 9,020,757 B2 | 4/2015 | Peake | |
| 9,043,096 B2 | 5/2015 | Zielke | |
| 9,052,714 B2 | 6/2015 | Creasey et al. | |
| 9,098,085 B2 | 8/2015 | Aznavorian et al. | |
| 9,129,523 B2 | 9/2015 | Martin | |
| 9,162,703 B2 | 10/2015 | Miller et al. | |
| 9,188,986 B2 | 11/2015 | Baumann | |
| 9,213,905 B2 | 12/2015 | Lange et al. | |
| 9,265,187 B2 | 2/2016 | Cavender-Bares et al. | |
| 9,374,940 B2 | 6/2016 | Nelson | |
| 9,392,743 B2 | 7/2016 | Camacho-Cook et al. | |
| 9,393,990 B2 * | 7/2016 | Davis | B62D 1/28 |
| 9,417,120 B2 | 8/2016 | Zielke | |
| 9,420,203 B2 | 8/2016 | Broggi et al. | |
| 9,420,737 B2 | 8/2016 | Trimble | |
| 9,423,509 B2 | 8/2016 | Georgy | |
| 9,446,791 B2 | 9/2016 | Nelson, Jr | |
| 9,451,367 B2 | 9/2016 | Basseas et al. | |
| 9,464,913 B2 | 10/2016 | Brown et al. | |
| 9,489,576 B2 | 11/2016 | Johnson | |
| 9,503,850 B2 | 11/2016 | Sheha | |
| 9,510,498 B2 | 12/2016 | Tuttle et al. | |
| 9,527,211 B2 | 12/2016 | Posselius et al. | |
| 9,545,048 B2 | 1/2017 | Deere | |
| 9,582,002 B2 | 2/2017 | Cavender-Bares | |
| 9,615,497 B2 | 4/2017 | Bassett et al. | |
| 9,675,008 B1 | 6/2017 | Rusciolelli et al. | |
| 9,750,173 B2 | 9/2017 | Dix | |
| 9,795,074 B2 | 10/2017 | Stratton | |
| 9,804,603 B1 | 10/2017 | Yegerlehner | |
| 9,807,934 B2 | 11/2017 | Busciolelli et al. | |
| 9,840,003 B2 | 12/2017 | Stzatmary | |
| 9,849,828 B2 | 12/2017 | Foster et al. | |
| 9,857,478 B2 | 1/2018 | Joughin | |
| 9,861,040 B2 | 1/2018 | Bonefas | |
| 9,880,560 B2 | 1/2018 | Han | |
| 9,898,688 B2 | 2/2018 | Bleiweiss | |
| 9,936,637 B2 | 4/2018 | Anderson | |
| 9,964,559 B2 | 5/2018 | Zielke | |
| 9,996,081 B2 * | 6/2018 | Owens | G05D 1/021 |
| 10,065,722 B1 | 9/2018 | Jaszewski et al. | |
| 10,099,609 B2 | 10/2018 | Pagliani | |
| 10,104,822 B2 | 10/2018 | Couchman | |
| 10,104,827 B2 | 10/2018 | Adamchuk et al. | |
| 10,114,378 B2 | 10/2018 | Korthals et al. | |
| 10,130,022 B2 | 11/2018 | Blackwell et al. | |
| 10,131,376 B2 | 11/2018 | Mortimer | |
| 10,143,126 B2 | 12/2018 | Foster et al. | |
| 10,152,891 B2 | 12/2018 | Rusciolelli et al. | |
| 10,165,722 B2 | 1/2019 | Ackerman et al. | |
| 10,168,714 B2 | 1/2019 | Webber | |
| 10,206,324 B2 | 2/2019 | Gerrish | |
| 10,215,572 B2 | 2/2019 | Urano et al. | |
| 10,246,087 B2 | 4/2019 | Mitchell et al. | |
| 10,254,765 B2 | 4/2019 | Deere | |
| 10,255,670 B1 | 4/2019 | Wu et al. | |
| 10,264,431 B2 | 4/2019 | Vandapel et al. | |
| 10,267,820 B2 | 4/2019 | Zielke | |
| 10,272,940 B2 | 4/2019 | Staehle | |
| 10,299,422 B2 | 5/2019 | Schleicher | |
| 10,324,471 B2 | 6/2019 | Etoh | |
| 10,328,934 B2 | 6/2019 | Minster | |
| 10,338,594 B2 | 7/2019 | Long | |
| 10,365,404 B2 | 7/2019 | Collins | |
| 10,384,709 B2 * | 8/2019 | Joughin | B62D 1/00 |
| 10,398,084 B2 | 9/2019 | Ray et al. | |
| 10,407,873 B2 | 9/2019 | Ono | |
| 10,412,893 B2 | 9/2019 | Missotten et al. | |
| 10,479,354 B2 | 11/2019 | Posselius | |
| 10,491,879 B2 | 11/2019 | Redden | |
| 10,531,603 B2 | 1/2020 | Ferrari et al. | |
| 10,551,844 B2 | 2/2020 | Biber et al. | |
| 10,575,453 B2 | 3/2020 | Blackwell et al. | |
| 10,583,832 B2 | 3/2020 | Foster et al. | |
| 10,612,932 B2 | 4/2020 | Sunil Kumar | |
| 10,633,023 B2 | 4/2020 | Ghannam | |
| 10,635,110 B2 | 4/2020 | Shashua | |
| 10,684,305 B2 | 6/2020 | Zielke et al. | |
| 10,696,227 B2 | 6/2020 | Stein | |
| 10,698,402 B2 | 6/2020 | Kosa et al. | |
| 10,747,233 B2 | 8/2020 | Ogura | |
| 10,780,930 B1 | 9/2020 | Kentley-Klay | |
| 10,788,835 B2 | 9/2020 | Hurd et al. | |
| 10,795,351 B2 | 10/2020 | Hurd | |
| 10,820,508 B2 | 11/2020 | Dix | |
| 10,822,017 B2 * | 11/2020 | Tan | B62D 5/0409 |
| 10,845,810 B2 | 11/2020 | Flajolet | |
| 10,962,376 B2 | 3/2021 | Fong et al. | |
| 10,966,369 B2 | 4/2021 | Suleman | |
| 11,091,192 B2 * | 8/2021 | McMickell | G05D 1/021 |
| 11,092,696 B2 | 8/2021 | Eriksson | |
| 11,093,745 B2 | 8/2021 | Redden | |
| 11,212,954 B2 | 1/2022 | Maeder | |
| 11,315,258 B1 | 4/2022 | Anagnostopoulos | |
| 11,429,114 B2 | 8/2022 | Davis | |
| 11,612,096 B2 | 3/2023 | Sivinski | |

(56)                 References Cited

U.S. PATENT DOCUMENTS

| | | | |
|---|---|---|---|
| 11,697,414 | B2 | 7/2023 | Simmons |
| 11,790,539 | B1 | 10/2023 | Anagnostopoulos |
| 2001/0048755 | A1 | 12/2001 | Wiens |
| 2002/0059320 | A1 | 5/2002 | Tamaru |
| 2002/0072850 | A1 | 6/2002 | McClure |
| 2003/0023353 | A1 | 1/2003 | Badarneh |
| 2003/0085042 | A1 | 5/2003 | Rogala |
| 2003/0187577 | A1 | 10/2003 | McClure |
| 2004/0004544 | A1 | 1/2004 | Scott |
| 2004/0158355 | A1 | 8/2004 | Holmqvist |
| 2004/0264761 | A1 | 12/2004 | Mas |
| 2005/0074143 | A1 | 4/2005 | Kawai |
| 2006/0178825 | A1 | 8/2006 | Eglington |
| 2007/0021913 | A1 | 1/2007 | Heiniger |
| 2007/0071311 | A1 | 3/2007 | Rovira-Mas |
| 2007/0112700 | A1 | 5/2007 | Den Haan |
| 2008/0103690 | A1 | 5/2008 | Dix |
| 2008/0141814 | A1* | 6/2008 | Markfort ................ B62D 5/008 |
| | | | 74/492 |
| 2008/0215203 | A1 | 9/2008 | Dix |
| 2008/0269956 | A1 | 10/2008 | Dix |
| 2008/0306655 | A1 | 12/2008 | Dickson |
| 2009/0037041 | A1 | 2/2009 | Senneff |
| 2009/0099730 | A1 | 4/2009 | McClure |
| 2009/0112410 | A1 | 4/2009 | Shull |
| 2009/0118904 | A1 | 5/2009 | Birnie |
| 2010/0006308 | A1 | 1/2010 | Schmidt |
| 2010/0026555 | A1 | 2/2010 | Whittaker |
| 2010/0032492 | A1 | 2/2010 | Grimm |
| 2010/0094481 | A1 | 4/2010 | Anderson |
| 2011/0056753 | A1 | 3/2011 | Middlemiss |
| 2011/0056762 | A1 | 3/2011 | Markfort |
| 2011/0098890 | A1 | 4/2011 | Lee |
| 2011/0196565 | A1 | 8/2011 | Collins |
| 2011/0235923 | A1 | 9/2011 | Weisenburger |
| 2012/0050023 | A1 | 3/2012 | Sauder |
| 2012/0130593 | A1 | 5/2012 | Davis |
| 2012/0200697 | A1 | 8/2012 | Wuestefeld |
| 2012/0215410 | A1 | 8/2012 | McClure |
| 2013/0131925 | A1 | 5/2013 | Isaji |
| 2013/0186657 | A1 | 7/2013 | Kormann et al. |
| 2013/0317696 | A1 | 11/2013 | Koch |
| 2014/0116735 | A1 | 5/2014 | Bassett |
| 2014/0163806 | A1 | 6/2014 | Aznavorian |
| 2014/0324291 | A1 | 10/2014 | Jones |
| 2015/0041238 | A1 | 2/2015 | Davis |
| 2015/0081156 | A1 | 3/2015 | Trepagnier |
| 2015/0237795 | A1 | 8/2015 | Koch |
| 2015/0264866 | A1 | 9/2015 | Foster |
| 2015/0343403 | A1 | 12/2015 | Ruhland |
| 2015/0359163 | A1 | 12/2015 | Nelson |
| 2016/0214643 | A1* | 7/2016 | Joughin .................. B62D 5/04 |
| 2016/0229555 | A1 | 8/2016 | Millin |
| 2016/0280250 | A1 | 9/2016 | Stahle |
| 2017/0016870 | A1 | 1/2017 | McPeek |
| 2017/0102702 | A1 | 4/2017 | Ishijima |
| 2017/0135277 | A1 | 5/2017 | Hiramatsu |
| 2017/0147005 | A1 | 5/2017 | Ramm |
| 2017/0242095 | A1 | 8/2017 | Schuh |
| 2017/0248963 | A1 | 8/2017 | Levinson et al. |
| 2017/0249517 | A1 | 8/2017 | Cho |
| 2017/0297621 | A1 | 10/2017 | Bunderson |
| 2017/0357267 | A1 | 12/2017 | Foster et al. |
| 2017/0359941 | A1 | 12/2017 | Czapka |
| 2018/0017965 | A1 | 1/2018 | Kosa |
| 2018/0024549 | A1 | 1/2018 | Hurd |
| 2018/0068416 | A1 | 3/2018 | Chandra |
| 2018/0081058 | A1 | 3/2018 | Kalscheur |
| 2018/0084727 | A1 | 3/2018 | Andrios |
| 2018/0096605 | A1 | 4/2018 | Bai |
| 2018/0201299 | A1* | 7/2018 | Ashtari ..................... F16H 1/06 |
| 2018/0216942 | A1 | 8/2018 | Wang |
| 2018/0238730 | A1 | 8/2018 | Meier |
| 2018/0326982 | A1 | 11/2018 | Paris |
| 2018/0329415 | A1 | 11/2018 | Aoi |

| | | | |
|---|---|---|---|
| 2019/0021211 | A1 | 1/2019 | Gutknecht |
| 2019/0039626 | A1 | 2/2019 | Hatano |
| 2019/0071092 | A1 | 3/2019 | Ma |
| 2019/0075706 | A1 | 3/2019 | Cavender-Bares et al. |
| 2019/0090472 | A1 | 3/2019 | Crinklaw |
| 2019/0124822 | A1 | 5/2019 | Czapka |
| 2019/0133024 | A1 | 5/2019 | Gerrish |
| 2019/0146511 | A1 | 5/2019 | Hurd et al. |
| 2019/0174667 | A1 | 6/2019 | Gresch |
| 2019/0275939 | A1 | 9/2019 | Kim |
| 2019/0302799 | A1 | 10/2019 | Schaff |
| 2019/0373801 | A1 | 12/2019 | Schoeny |
| 2020/0023835 | A1 | 1/2020 | Harda |
| 2020/0100421 | A1 | 4/2020 | Wang |
| 2020/0128734 | A1 | 4/2020 | Brammeier |
| 2020/0133262 | A1 | 4/2020 | Suleman |
| 2020/0150673 | A1 | 5/2020 | Qiu |
| 2020/0178455 | A1 | 6/2020 | Ishikawa |
| 2020/0193589 | A1 | 6/2020 | Peshlov et al. |
| 2020/0231210 | A1 | 7/2020 | Anderson |
| 2020/0319655 | A1 | 10/2020 | Desai |
| 2020/0352082 | A1 | 11/2020 | Maeder et al. |
| 2020/0352088 | A1 | 11/2020 | Arnett |
| 2021/0000006 | A1 | 1/2021 | Ellaboudy |
| 2021/0003416 | A1 | 1/2021 | Wilson et al. |
| 2021/0026362 | A1 | 1/2021 | Wilson et al. |
| 2021/0051837 | A1 | 2/2021 | Barry et al. |
| 2021/0053561 | A1 | 2/2021 | Beller |
| 2021/0094539 | A1 | 4/2021 | Beller |
| 2021/0132618 | A1 | 5/2021 | Van Roekel |
| 2021/0161060 | A1 | 6/2021 | Kaufmann |
| 2021/0185882 | A1 | 6/2021 | Eichhorn |
| 2021/0195824 | A1 | 7/2021 | Van Roekel |
| 2021/0195840 | A1 | 7/2021 | Puryk |
| 2021/0294337 | A1 | 9/2021 | Van Mill |
| 2021/0315147 | A1 | 10/2021 | Fanshier |
| 2021/0364631 | A1 | 11/2021 | Hasegawa et al. |
| 2021/0365036 | A1 | 11/2021 | Dix |
| 2021/0396528 | A1 | 12/2021 | St. Romain |
| 2022/0011444 | A1 | 1/2022 | Eichhorn et al. |
| 2022/0019240 | A1 | 1/2022 | Christiansen |
| 2022/0026226 | A1 | 1/2022 | Eichhorn |
| 2022/0061202 | A1 | 3/2022 | Holoubek et al. |
| 2022/0078975 | A1 | 3/2022 | Slichter |
| 2022/0105932 | A1 | 4/2022 | Omikawa |
| 2022/0130145 | A1 | 4/2022 | Connary |
| 2022/0232759 | A1 | 7/2022 | Sauder |
| 2022/0272888 | A1 | 9/2022 | Hodel |
| 2022/0284669 | A1 | 9/2022 | Heinonen |
| 2022/0317688 | A1 | 10/2022 | Li |
| 2022/0332365 | A1 | 10/2022 | Calderon |
| 2022/0363280 | A1 | 11/2022 | Calderon |
| 2022/0365163 | A1 | 11/2022 | Baek |
| 2022/0386527 | A1 | 12/2022 | Schleicher |
| 2022/0410704 | A1 | 12/2022 | O'Connor |
| 2023/0124026 | A1 | 4/2023 | Hansen |
| 2023/0229163 | A1 | 7/2023 | Rust |
| 2023/0230202 | A1 | 7/2023 | Eichhorn et al. |
| 2023/0292664 | A1 | 9/2023 | Zielke et al. |
| 2024/0000011 | A1 | 1/2024 | Zielke et al. |
| 2024/0044346 | A1 | 2/2024 | Barry et al. |
| 2024/0053759 | A1 | 2/2024 | Wilson |
| 2024/0381803 | A1 | 11/2024 | Wagner |
| 2024/0389494 | A1 | 11/2024 | Vorobiev |
| 2025/0002070 | A1 | 1/2025 | Brand |
| 2025/0008874 | A1 | 1/2025 | Townsend |
| 2025/0169390 | A1 | 5/2025 | Eichhorn |
| 2025/0241246 | A1 | 7/2025 | Woodcock |
| 2025/0256762 | A1 | 8/2025 | Johnson |

FOREIGN PATENT DOCUMENTS

| | | | |
|---|---|---|---|
| DE | 102009039450 | A1 | 5/2010 |
| DE | 102013203549 | A1 | 9/2014 |
| EP | 1773647 | B1 | 2/2010 |
| EP | 2511152 | A1 | 11/2013 |
| JP | 2021101303 | A | 7/2021 |
| JP | 2022060934 | A | 4/2022 |
| KR | 101728137 | B1 | 4/2017 |

(56)                    References Cited

FOREIGN PATENT DOCUMENTS

WO          2017004074 A1      1/2017
WO          2017074863 A1      5/2017
WO          2018165199 A4      9/2018
WO          2019042956 A1      3/2019

OTHER PUBLICATIONS

Pajares et al., "Machine-Vision Systems Selection for Agricultural Vehicles: A Guide", Journal of Imaging, Nov. 22, 2016, pp. 1-31, vol. 2, No. 34, Publisher: MDPI.
Pix4d, "How to calibrate a Perspective Lens Camera", https://support.pix4d.com/hc/en-us/articles/206065716-How-to-calibrate-a-Perspective-Lens-Camera.
"Dp RTK/PPK drones give you better results than GCPs?", https://www.pix4d.com/blog/why-ground-control-points-Important, Aug. 26, 2017, Publisher: PIX4D.
Rankin et al., "Daytime Mud Detection for Unmanned Ground Vehicle Autonomous Navigation", , pp. 1-9, Publisher: Jet Propulsion Laboratory, California Institute of Technology.
Reid, "Precision Guidance of Agricultural Vehicles", 1998, pp. 1-10.
Rovira-Mas et al., "Stereo vision three-dimensional terrain maps for precision agriculture", computers and electronics in agriculture, 2008, pp. 133-143, Publisher: ScienceDirect.
Saarinen et al., "3D Normal Distributions Transform Occupancy Maps: An Efficient Representation for Mapping in Dynamic Environments", Mapping in 3D Environments, , pp. 1-24.
Subramanian et al., "Development of machine vision and laser radar based autonomous vehicle guidance systems for citrus grove navigation", Computers and Electronics in Agriculture, 2006, pp. 130-143, No. 53, Publisher: ScienceDirect.
"Top Air Steerable Hitch", Unverferth Mfg. Co., Inc.
Raven Precision, "Viper 4+ and Job Sync", Aug. 7, 2018, Youtube.
Barry et al., "Accuracy of UAV Photogrammetry Compared With Network RTK GPS", , Publisher: Baseline Surveys Ltd, Published in: IE.
Bruns, "Thesis—Lidar-based Vehicle Localization in an Autonomous Valet Parking Scenario", 2016, Publisher: The Ohio State University.
Cho et al., "Autonomous speed sprayer guidance using machine vision and fuzzy logic", 1999, pp. 1137-1143, vol. 42, No. 4, Publisher: Transactions of the ASAE.
"Machine Sync Activation", https://www.deere.com/en/technology-products/precision-ag-technology/guidance/machine-sync/, , Publisher: John Deere US.
English et al., "Vision Based Guidance for Robot Navigation in Agriculture".
Im et al., "Parking Line Based SLAM Approach Using AVM/LiDAR Sensor Fusion for Rapid and Accurate Loop Closing and Parking Space Detection", Sensors, Nov. 5, 2019, pp. 1-17, Publisher: MDPI.
Leonard et al., "Dynamic Map Building for an Autonomous Mobile Robot", Aug. 1992, pp. 4, No. 11, Publisher: The International Journal of Robotics.
Muller Elektronik Gmbh & Co. Kg, "Installation and Operating Instructions Trail-Control Manufacturer", Mar. 2001, Published in: Germany.
Muller-Elektronik Gmbh & Co.Kg, "Hardi Auto-Track Instruction Book", Jan. 10, 1996, Published in: Germany.
Muller Elektronik, "Installation and Users Guide TRAIL-Control II", Sep. 1, 2010, Published in: DE.
"Ground control points: why are they important?", https://www.pix4d.com/blog/why-ground-control-points-important, Dec. 3, 2019, Publisher: PIX4D.
Ehab Ghanem, Kyle O'Keefe, and Richard Klukas. Testing vehicle-to-vehicle relative position and at-titude estimation using multiple uwb ranging. In 2020 IEEE 92nd Vehicular Technology Conference (VTC2020-Fall), pp. 1-5. IEEE, 2020.

Ag Leader Technology—OnTrac3—PN2006236.
Orthman—Steerable guidance coulters—Tracker IV.
P. Barry and R. Coakley, 2015, Accuracy of UAV Photogrammetry Compared with Network RTK GPS.
Protracker Guidance Systems—300DB Hydraulic Hitch Specifications.
Raven Cart Automation—https://www.ravenind.com/products/autonomy/raven-cart-automation.
SUNCO Farm Equipment—Pull Implement Guidance.
Wei Jiang, Zhuojian Cao, Baigen Cai, Binghao Li, and Jian Wang. Indoor and outdoor seamless po-sitioning method using uwb enhanced multi-sensor tightly-coupled integration. IEEE Transactions on Vehicular Technology, 70 (10):10633-10645, 2021.
Yu Xianjia, Li Qingqing, Jorge Pena Queralta, Jukka Heikkonen, and Tomi Westerlund. Cooperative uwb-based localization for out-doors positioning and nav-igation of uavs aided by ground robots. In 2021 IEEE International Conference on Autonomous Sys-tems (ICAS), pp. 1-5. IEEE, 2021.
Raven Industries—SmartTrax™ MD Installation Manual, 2013.
Trimble—EZ-Pilot Pro Guidance System, 2018.
Ag Leader Technology—OnTra03 Operators Manual PN2006236-ENG REV. B.
Trimble—EZ-Steer System, 2010.
Raven Industries—Direcsteer, available as early as 2023.
FJDynamics—GPS Guidance Auto Steer System for Tractor.
FJDynamics—Navigate to Next-level Efficiency—FJD AT2 Auto Steer System.
CHCNAV—ANX510 SE AutoSteer.
John Deere—AutoTrac Universal (ATU) Steering Kit, 2007.
John Deere—Precision Ag Technology—AutoTrac Universal 300.
Agjunction—Wheelman Flex Installation Guide, Fit Kit: 810-0036-01.
Case IH Active Implement Guidance—https://www.youtube.com/watch?v=Kb059Tj1Q_k.
Orthman—Tracker implement guidance—Unknown available as early as 2012—https://www.facebook.com/orthmanag/videos/tracker-implement-guidance/3057072390855/.
John Deere FarmSight—Active Implement Guidance, available as early as 2013—https://www.youtube.com/watch?v=JqBM1hH_MBs.
Anand et al., "AgriSegNet: Deep Aerial Semantic Segmentation Framework for IoT-Assisted Precision Agriculture", IEEE Sensors Journal, 2021, pp. 17581-17590, vol. 21, No. 16.
Bhagat et al., "MS-Net: A CNN Architecture for Agriculture Pattern Segmentation in Aerial Images", 2022, Publisher: Cham: Springer International Publishing.
Imai et al., "Shadow detection in hyperspectral images acquired by UAV", The International Archives of Photogrammetry, Remote Sensing and Spatial Information Sciences, 2019, pp. 371-377.
Innani et al., "Fuse-pn: A novel architecture for anomaly pattern segmentation in aerial agricultural images", 2021.
Shrestha et al., "Automatic Corn Plant Population Measurement Using Machine Vision", Agricultural and Biosystems Engineering Conference Proceedings and Presentations., 2001, No. 37.
Shrestha et al., "Shape and Size Analysis of Corn Plant Canopies for Plant Population and Spacing Sensing", 2005, pp. 295-303.
Tang et al., "Plant Identification in Mosaicked Crop Row Images for Automatic Emerged Corn Plant Spacing Measurement", 2008, pp. 2181-2191.
Thorp et al., "Using Aerial Hyperspectral Remote Sensing Imagery to Estimate Corn Plant Stand Density", 2008, pp. 311-320.
Wolters, D., "Assessment of Corn Plant Population at Emergence from Processed Color Aerial Imagery", 2015.
AutoFarm—OnTrac2, Unknown available as early as 2009, https://www.farmprogress.com/farming-equipment/autofarm-introduces-ontrac2-gps-assisted-steering-system.
Novariant—Ontrac2+, Unknown available as early as 2012.
Protracker Guidance Systems—400DB Hydraulic Hitch Specifications.
Ashley Napier, Paul Newman, "Generation and Exploitation of Local Orthographic Imagery for Road Vehicle Localisation", 2012, 2012 IEEE Intelligent Vehicles Sysmposium, pp. 590-596, DOI: 10.1109/IVS.2012.6232165.
GameMaker Community—https://forum.gamemaker.io/index.php?threads/sprite-real-multi-recoloring-using-shaders.12601, 2016.

(56) References Cited

OTHER PUBLICATIONS

Orthman—GPS Tracker IV, https://orthman.com.au/implement-guidance/.
SunNav, AG400 GNSS Auto-Steering System.
Mike Williams, Google Maps Review; https://web.archive.org/web/20210128011918/https://www.pcmag.com/reviews/google-maps (Year: 2021).

* cited by examiner

ASSISTED STEERING APPARATUS AND ASSOCIATED SYSTEMS AND METHODS

CROSS-REFERENCE TO RELATED APPLICATION(S)

This application claims the benefit under 35 U.S.C. § 119 (e) to U.S. Provisional Application 63/026,208, filed May 18, 2020, and entitled "Assisted Steering Apparatus and Associated Systems and Methods," which is hereby incorporated herein by reference in its entirety for all purposes.

TECHNICAL FIELD

The disclosed technology relates generally to devices, systems and methods for use in agriculture, including various self-propelled agricultural vehicles, and in particular, to assisted steering devices for use in agricultural applications.

BACKGROUND

Various assisted steering devices exist in the art. There is a need for improved assisted steering devices.

BRIEF SUMMARY

Disclosed herein are various assisted steering devices, particularly assisted steering devices for use in agricultural applications although other uses with other applications are possible and contemplated herein.

Example 1 relates to an assisted steering unit, comprising a ring assembly and a motor drive unit (MDU). The ring assembly comprising a housing, a ring gear disposed within the housing, and an anti-rotation pin operatively engaged with the housing. The motor drive unit (MDU) comprising a motor and a drive gear rotatably engaged with the motor, wherein the ring assembly and motor drive unit are constructed and arranged to be releasably engaged to each other.

Example 2 relates to the assisted steering unit of Example 1, wherein the motor is a brushless DC motor.

Example 3 relates to the assisted steering unit of Example 1, further comprising a latching mechanism configured for attachment of the MDU to the ring assembly.

Example 4 relates to the assisted steering unit of Example 1, wherein the housing comprises one or more depressions corresponding to a location of one or more spokes on a steering wheel.

Example 5 relates to the assisted steering unit of Example 1, wherein the drive gear is configured to interface with the ring gear when the MDU is engaged with the ring assembly.

Example 6 relates to the assisted steering unit of Example 1, wherein the ring assembly is divided into two sections for placement around a steering column.

Example 7 relates to the assisted steering unit of Example 1, further comprising a circuit board in communication with the motor configured to control rotation of the drive gear.

Example 8 relates to a steering system comprising a modular ring assembly and a motor drive unit configured to be releasably engaged with the modular ring assembly. The modular ring assembly comprising a stationary ring, a rotatable ring fitted to the stationary ring, and a ring gear attached to the rotatable ring, wherein the stationary ring and the rotatable ring form a housing for the ring gear. The motor drive unit comprising a motor and a drive gear driven by the motor, the drive gear configured to be engaged with the ring gear when the motor drive unit is engaged with the modular ring assembly, wherein the motor drives the drive gear, that causes rotation of the ring gear that causes rotation of the rotatable ring, that causes rotation of a steering wheel.

Example 9 relates to the system of Example 8, further comprising a clamping ring configured to be attached ring assembly and to secure the modular ring assembly to a steering wheel.

Example 10 relates to the system of Example 8, further comprising an anti-rotation pin engaged with the stationary ring and configured to be attached to a steering column.

Example 11 relates to the system of Example 10, further comprising a bracket configured to be disposed on the steering column for engaging with the anti-rotation pin.

Example 12 relates to the system of Example 8, further comprising a roller assembly configured to align and guide the rotation of the ring gear.

Example 13 relates to the system of Example 8, further comprising a sensor within the motor drive unit for sensing rotation of the drive gear, the ring gear, and a steering wheel.

Example 14 relates to the system of Example 13, further comprising a power adaptor for providing power to the motor drive unit.

Example 15 relates to an assisted steering system comprising a first ring unit configured to be operatively engaged with a first steering column of a first vehicle; a motor drive unit (MDU) configured to be releasably engaged with the first ring unit; and a power supply in communication with the MDU, wherein the MDU controls motion of the first ring unit, and wherein the first ring unit is configured to turn a steering wheel of the first vehicle.

Example 16 relates to the assisted steering system of Example 15, further comprising a second ring unit configured to be operatively engaged with a second steering column of a second vehicle, wherein the MDU is configured to be releasably engaged with the second ring unit when not engaged with the first ring unit.

Example 17 relates to the assisted steering system of Example 15, wherein the first ring unit comprises a stationary ring, a rotatable ring fitted to the stationary ring, and a ring gear attached to the rotatable ring, wherein the stationary ring and the rotatable ring form a housing for the ring gear.

Example 18 relates to the assisted steering system of Example 17, wherein the MDU comprises a motor and a drive gear driven by the motor, the drive gear configured to be engaged with the ring gear when the MDU is engaged with the first ring unit.

Example 19 relates to the assisted steering system of Example 17, wherein the first ring unit further comprises a cartridge comprising at least one spring and a roller, wherein the cartridge is configured to maintain operational contact between the ring gear and the roller.

Example 20 relates to the assisted steering system of Example 19, wherein the cartridge is modular and field replaceable.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
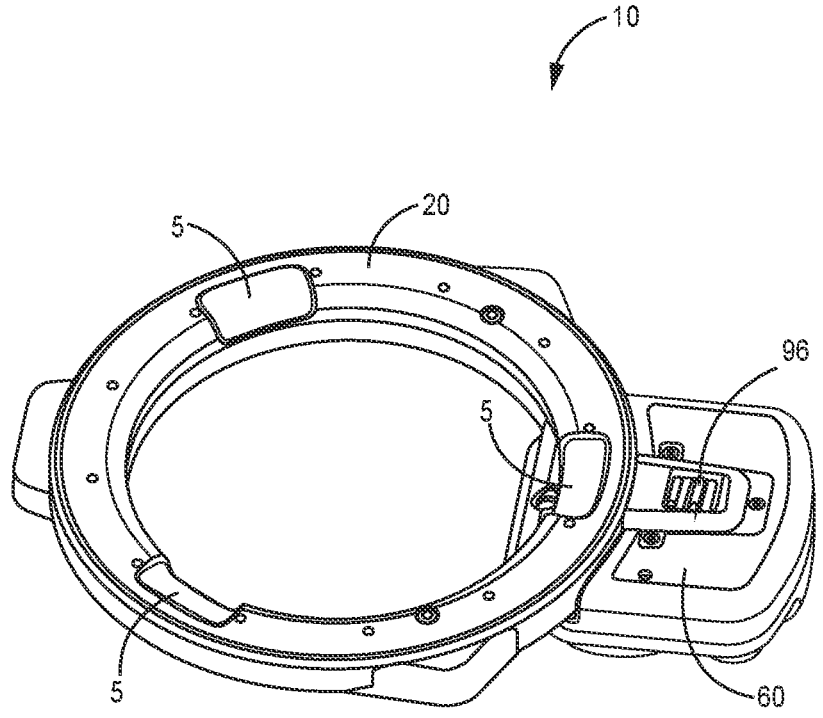
FIG. 1 is a perspective view of the system, according to one implementation.

The various implementations disclosed and contemplated herein relate to compact, quick-release assisted steering devices and systems, particularly for use in agricultural applications, although use in various alternative applications is contemplated herein. The various assisted steering devices and associated systems and methods are of minimal size or form factor, and only have the essential drive components so as to maximize ease of use and transportability. It is understood that the various assisted steering technologies disclosed or contemplated herein can be incorporated into any known agricultural implement or application having a steering system such as, but not limited to, planters, combines, tractors, and harvesters.

Certain of the disclosed implementations can be used in conjunction with any of the devices, systems or methods taught or otherwise disclosed in U.S. application Ser. No. 16/121,065, filed Sep. 1, 2018, and entitled "Planter Down Pressure and Uplift Devices, Systems, and Associated Methods," U.S. Pat. No. 10,743,460, filed Oct. 3, 2018, and entitled "Controlled Air Pulse Metering Apparatus for an Agricultural Planter and Related Systems and Methods,"

U.S. application Ser. No. 16/272,590, filed Feb. 11, 2019, and entitled "Seed Spacing Device for an Agricultural Planter and Related Systems and Methods," U.S. application Ser. No. 16/142,522, filed Sep. 26, 2018, and entitled "Planter Downforce and Uplift Monitoring and Control Feedback Devices, Systems and Associated Methods," U.S. application Ser. No. 16/280,572, filed Feb. 20, 2019 and entitled "Apparatus, Systems and Methods for Applying Fluid," U.S. application Ser. No. 16/371,815, filed Apr. 1, 2019, and entitled "Devices, Systems, and Methods for Seed Trench Protection," U.S. application Ser. No. 16/523,343, filed Jul. 26, 2019, and entitled "Closing Wheel Downforce Adjustment Devices, Systems, and Methods," U.S. application Ser. No. 16/670,692, filed Oct. 31, 2019, and entitled "Soil Sensing Control Devices, Systems, and Associated Methods," U.S. application Ser. No. 16/684,877, filed Nov. 15, 2019, and entitled "On-The-Go Organic Matter Sensor and Associated Systems and Methods," U.S. application Ser. No. 16/752,989, filed Jan. 27, 2020, and entitled "Dual Seed Meter and Related Systems and Methods," U.S. application Ser. No. 16/891,812, filed Jun. 3, 2020, and entitled "Apparatus, Systems, and Methods for Row Cleaner Depth Adjustment On-The-Go," U.S. application Ser. No. 16/921,828, filed Jul. 6, 2020, and entitled "Apparatus, Systems and Methods for Automatic Steering Guidance and Visualization of Guidance Paths," U.S. application Ser. No. 16/939,785, filed Jul. 27, 2020, and entitled "Apparatus, Systems and Methods for Automated Navigation of Agricultural Equipment," U.S. application Ser. No. 16/997,361, filed Aug. 19, 2020, and entitled "Apparatus, Systems, and Methods for Steerable Toolbars," U.S. application Ser. No. 16/997,040, filed Aug. 19, 2020, and entitled "Adjustable Seed Meter and Related Systems and Methods," U.S. application Ser. No. 17/011,737, filed Aug. 3, 2020, and entitled "Planter Row Unit and Associated Systems and Methods," U.S. application Ser. No. 17/060,844, filed Oct. 1, 2020, and entitled "Agricultural Vacuum and Electrical Generator Devices, Systems, and Methods," U.S. application Ser. No. 17/105, 437, filed Nov. 25, 2020, and entitled "Devices, Systems And Methods For Seed Trench Monitoring And Closing," U.S. application Ser. No. 17/127,812, filed Dec. 18, 2020, and entitled "Seed Meter Controller and Associated Devices, Systems, and Methods," U.S. application Ser. No. 17/132, 152, filed Dec. 23, 2020, and entitled "Use of Aerial Imagery For Vehicle Path Guidance And Associated Devices, Systems, And Methods," and U.S. application Ser. No. 17/164, 213 filed Feb. 1, 2021 and entitled "Row Unit Parallel Arm Sensor and Associated Systems and Methods," U.S. Pat. No. 10,684,305 issued Jun. 16, 2020, entitled "Apparatus, Systems and Methods for Cross Track Error Calculation From Active Sensors," U.S. patent application Ser. No. 16/445, 161, filed Jun. 18, 2019, entitled "Agricultural Systems Having Stalk Sensors and/or Data Visualization Systems and Related Devices and Methods," U.S. patent application Ser. No. 16/800,469, filed Feb. 25, 2020, entitled "Vision Based Stalk Sensors and Associated Systems and Methods," U.S. patent application Ser. No. 17/013,037, filed Sep. 4, 2020, entitled "Apparatus, Systems and Methods for Stalk Sensing," U.S. patent application Ser. No. 16/918,300, filed Jul. 1, 2020, entitled "Apparatus, Systems, and Methods for Eliminating Cross-Track Error," U.S. Patent Application 63/048,797, filed Jul. 7, 2020, entitled "Apparatus, Systems, and Methods for Grain Cart-Grain Truck Alignment and Control Using GNSS and/or Distance Sensors," U.S. Patent Application 63/074,737, filed Sep. 4, 2020, entitled "Apparatus, Systems and Methods for an Electric Corn Head," U.S. Patent Application 63/137,946, filed Jan. 15, 2021, entitled "Apparatus, Systems, and Methods for Row Crop Headers," U.S. patent application Ser. No. 17/226,002, filed Apr. 8, 2021, and entitled "Apparatus, Systems and Methods For Stalk Sensing," U.S. patent application Ser. No. 17/225,586, filed Apr. 8, 2021, and entitled "Devices, Systems, and Methods for Corn Headers," and U.S. patent application Ser. No. 17/225,740, filed Apr. 8, 2021, and entitled "Devices, Systems, and Methods For Sensing The Cross-Sectional Area of Stalks," each of which are incorporated herein by reference.

Turning to the drawings in greater detail, FIG. 1 depicts one implementation of an assisted steering device 10 including a ring assembly 20 and a motor drive unit ("MDU") 60. It is readily appreciated that in such implementations, the MDU 60 is selectively and operably coupled to the ring assembly 20 so as to facilitate the rotation of the ring assembly 20 for use in automated steering operations, such as assisted steering. That is, in these implementations, the MDU 60 drives the rotation of the ring assembly 20 and, accordingly, the corresponding rotation of the steering wheel (shown for example in FIG. 3 at 2) of the agricultural implement.

Figure 2:
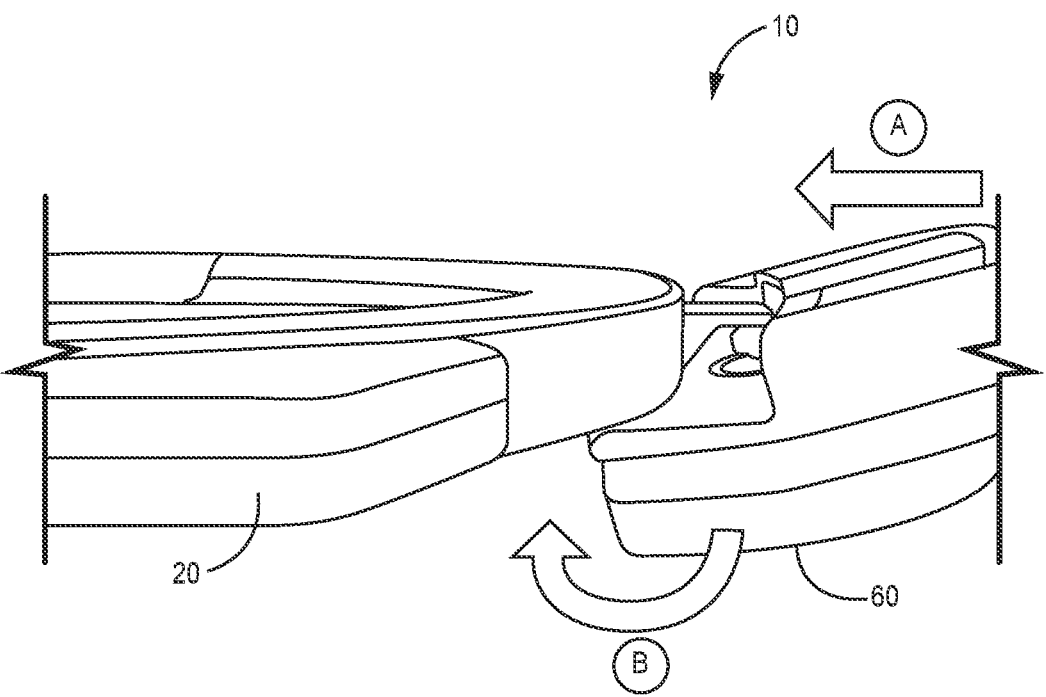
FIG. 2 is a side view of the system, according to one implementation.

Continuing with FIG. 1, and as also shown in FIG. 2, in various implementations the ring assembly 20 and MDU 60 are configured to be slidably engaged with one another to aid in the positioning and securing of the device 10 on a steering column in a vehicle. As shown for example in the implementation of FIG. 2, the MDU 60 can be operably secured to the ring assembly 20 by sliding the MDU 60 into position on the ring assembly 20, such as in the directions of reference arrows A and B. While FIG. 2 depicts some such examples of the coupling of the ring assembly 20 to the MDU 60, further implementations are of course possible.

In some implementations, the secured MDU 60 is also configured to be quickly released from the ring assembly 20, such as by releasing a latch 96 (shown in FIGS. 1, 14, and 22), as will be discussed further below. Further, the MDU 60 according to these implementations is compact and allows for easy transportation between various vehicles, such that an operator can utilize the device 10 in a variety of applications, as would be readily appreciated. Additionally, the compact nature of the MDU 60 allows for quick release, as well as easy storage, such as to protect the MDU 60/housing 62 against theft and/or inclement weather, as would be understood.

Figure 3:
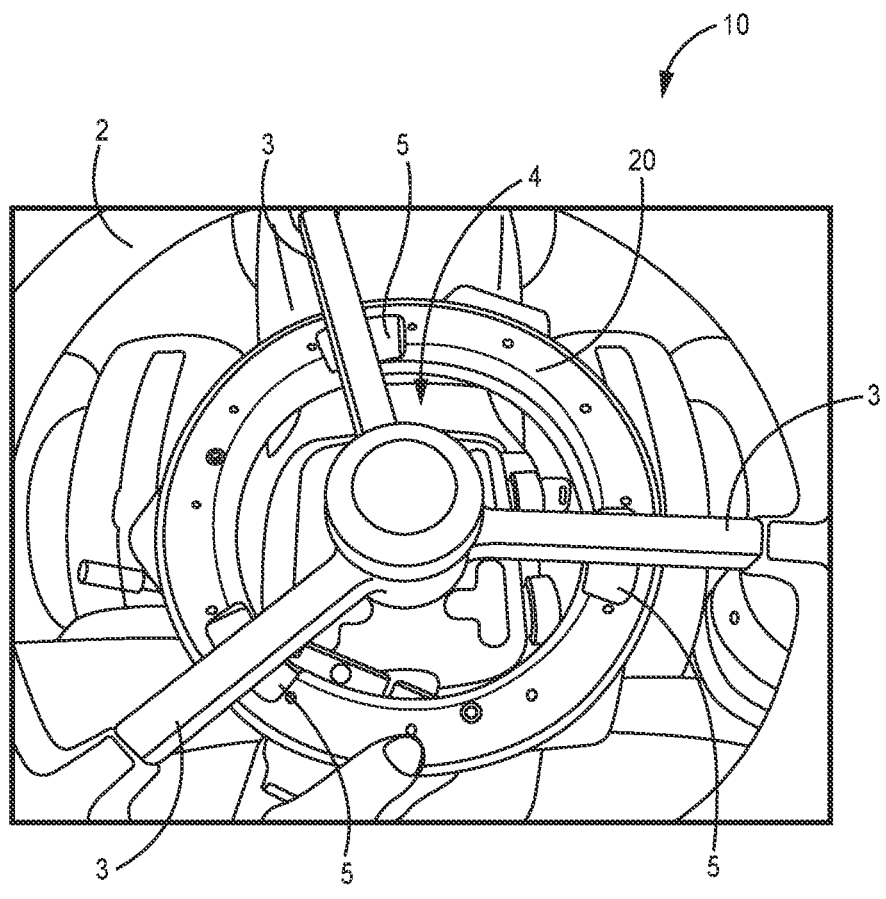
FIG. 3 is a top view of the system engaged with a steering wheel, according to one implementation.
Figure 4:
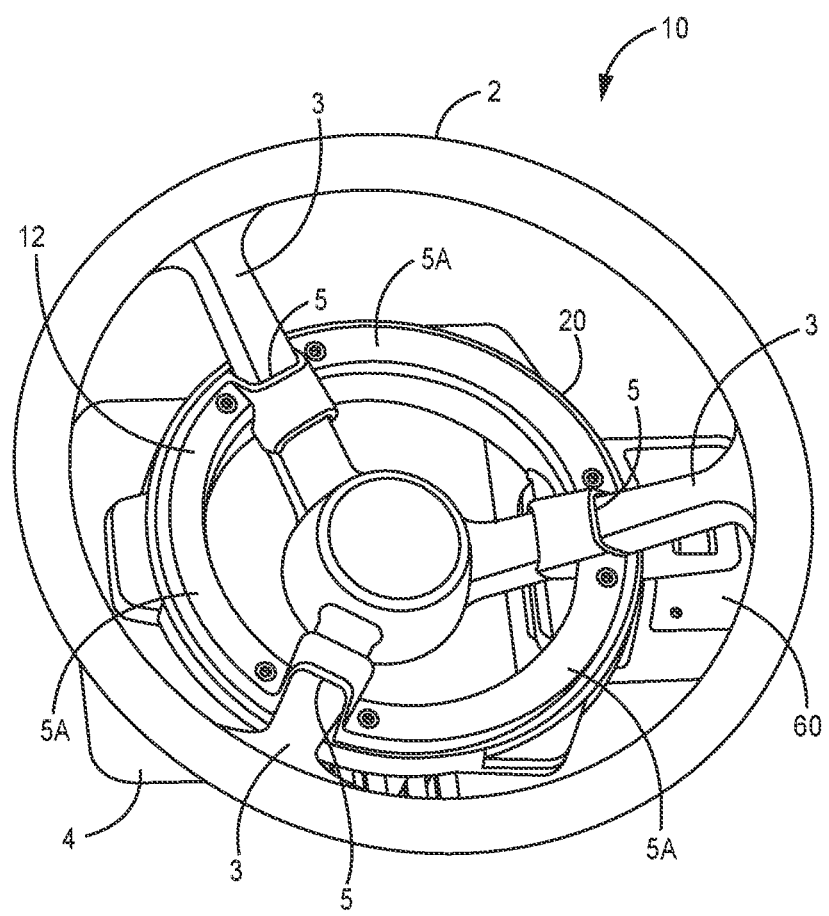
FIG. 4 is a top view of the system engaged with a steering wheel, according to one implementation.
Figure 5:
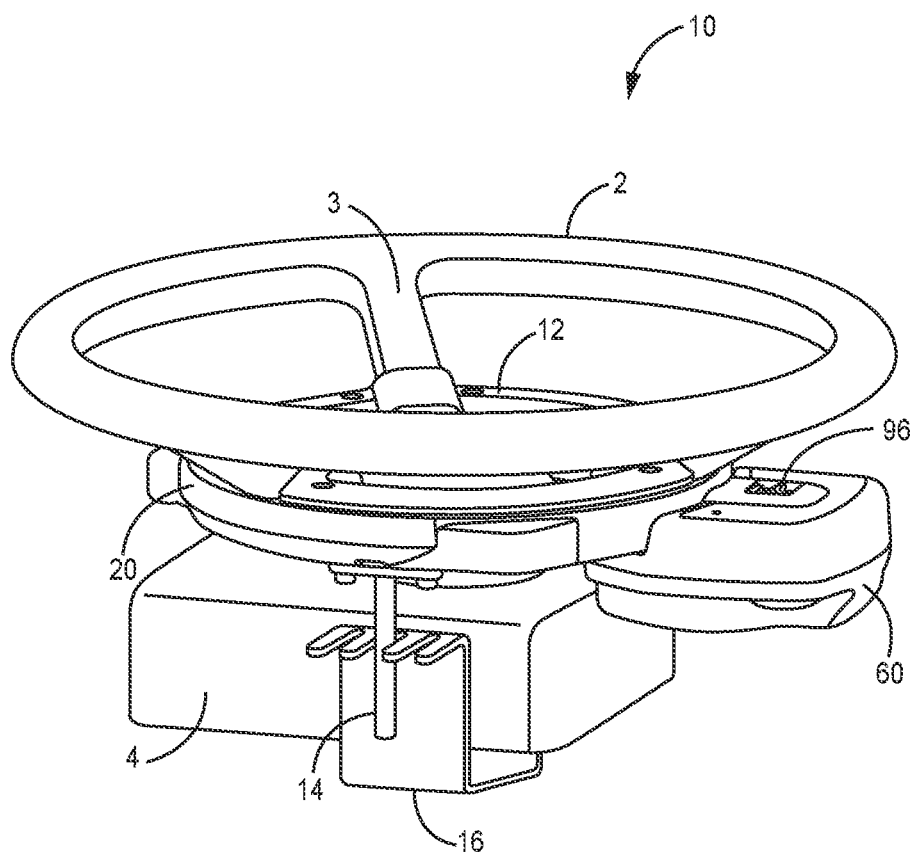
FIG. 5 is a side view of the system engaged with a steering wheel, according to one implementation.

It is readily appreciated that the assisted steering device 10 according to certain implementations is configured to be operatively engaged with a steering wheel 2, as shown for example in FIGS. 3-5. It is understood that such operative engagement allows the device 10 to apply a rotating force, such as a turning motion on the steering wheel 2 to automatically steer the vehicle or assist an operator in steering the vehicle via the driven application of rotational force to the steering wheel 2. Such application of rotating force can be achieved through the securement of the ring assembly 20 to the steering wheel 2 or other approaches that would be readily appreciated by the skilled artisan, and it is appreciated that such operation may be performed in conjunction with any of the technologies described in the incorporated references, such as on the basis of GPS or GNSS or other stored data or the like, or in conjunction with a display unit that is operationally integrated with the overall guidance system, as further discussed in conjunction with the implementation of FIG. 20.

Returning to the implementation of FIG. 3, the assisted steering device 10 is configured for quick release or disengagement from the steering wheel 2. In these implementations, shown for example in FIG. 4, the ring assembly 20 of the device 10 has a detachable clamping ring 12 and is therefore configured to be attached to the steering wheel 2 via the clamping ring 12. In these and other implementations, the clamping ring 12 is shaped to be fitted around the spokes 3 of the steering wheel 2 and secured to the ring assembly 20. In certain implementations, the spokes 3 of the steering wheel 2 are disposed in the corresponding depressions 5 (shown best in FIG. 3) of the ring assembly 20, such that the spokes 3 are between the ring assembly 20 and the clamping ring 12. Various alternative clamping/attachment devices and methods may be used as would be appreciated by those of skill in the art. In some implementations, the clamping mechanism allows for forward-rearward positioning of the device 10.

In certain implementations, as shown in FIG. 3, the depressions 5 allow for the steering wheel 2 spokes 3 to be seated, at least partially, within the ring assembly 20, creating a lower profile device 10. The optionally low profile of the device 10 allows for placement of the device 10, in particular the ring assembly 20, in smaller/tighter spaces, including between the underside of the steering wheel 2 and various shrouds, switches, levers, and/or other equipment components as would be appreciated.

In alternative implementations, the steering wheel 2 spokes 3 may be located on the surface of the ring assembly 20. In these implementations, the ring assembly 20 may not have depressions 5, such that the spokes 3 are located on the substantially flat upper surface of the ring assembly 20/inner ring 22. This configuration may allow for the device 10 to be accepted on more flat-style steering wheels 2 without the need for one or more spacers, as would be appreciated.

By locating the spokes 3 in-between the depressions 5, rather than within them, the ring assembly 20 acts as the spacer, orienting the ring assembly 20 and MDU 60 further away from the steering wheel 2. The ring assembly 20 may act as a spacer by having both depressions 5 and raised portions 5A between the depressions 5. In these implementations, there may be additional space created for an operator's hands to be placed between the MDU 60/ring assembly 20 and the steering wheel 2 thereby improving grip. In various implementations, one or more spacers (not pictured) may also be used, as would be understood by those of skill in the art.

Continuing with FIG. 4, in various implementations the device 10 and ring assembly 20 are mounted to the steering wheel 2 and steering column 4 in such an arrangement so as to provide ample clearance for an operator's hands to grip the steering wheel 2. Of course, other devices and methods are possible and would be appreciated by those of skill in the art.

Turning to FIG. 5, in certain implementations, an anti-rotation pin 14 or other stop is attached to the ring assembly 20 and extends in the direction of the steering column 4. In various implementations, the anti-rotation pin 14 is arranged on the ring assembly 20 such that the anti-rotation pin 14 remains affixed to the ring assembly 20 even when the MDU 60 is detached from the ring assembly 20. Said another way, in these implementations, the MDU 60 can be disengaged from the ring assembly 20 without removal of the anti-rotation pin 14 from the ring assembly 20.

In various implementations, the anti-rotation pin 14 may be mounted or otherwise attached to the ring assembly 20 in a variety of orientations. The anti-rotation pin 14 may be orientated to maximize visibility and access to various vehicle functions. In some implementations, the anti-rotation pin 14 may be mounted or otherwise attached to the ring assembly 20 at any point along the steering wheel 2/ring assembly 20. That is, the anti-rotation pin 14 may be attached at any point along the 360 degrees of the ring assembly 20.

In further implementations, the device 10 includes a mounting bracket 16. The mounting bracket 16 is fixedly attached to the steering column 4 such that the anti-rotation pin 14 may be mounted within the mounting bracket 16. In these implementations, torque provided by the device 10 is countered by the anti-rotation pin 14 within the bracket 16 during operation of the device 10 causing the steering wheel 2 to turn.

Figure 6:
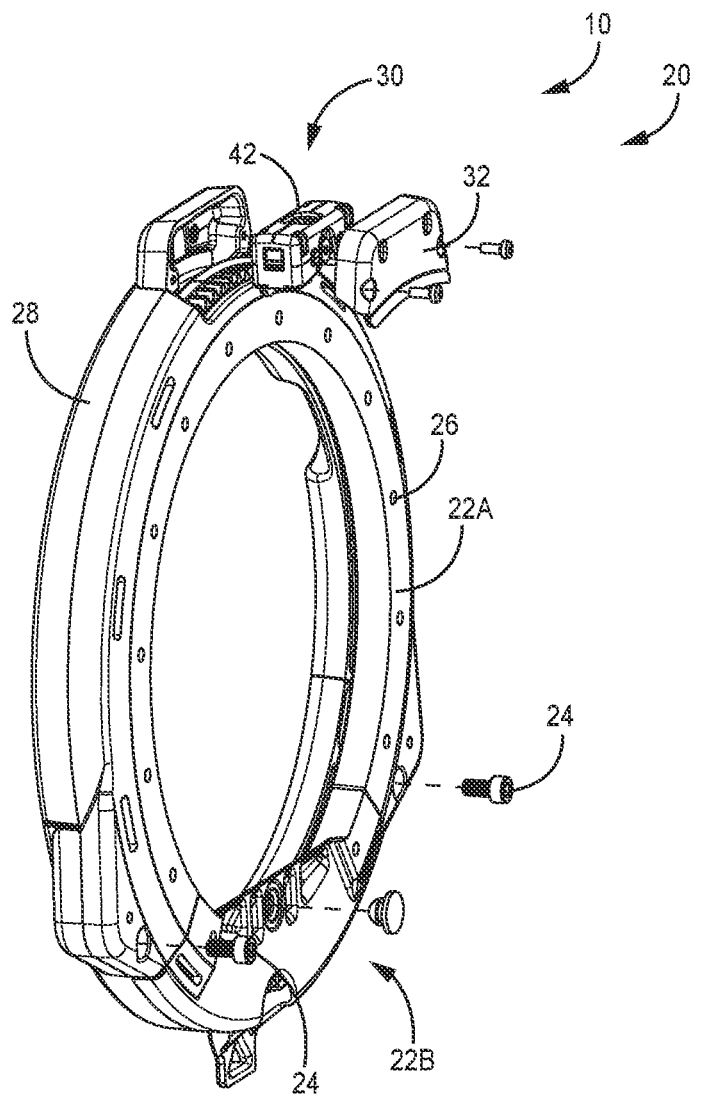
FIG. 6 is a side perspective view of the ring assembly, according to one implementation.
Figure 7:
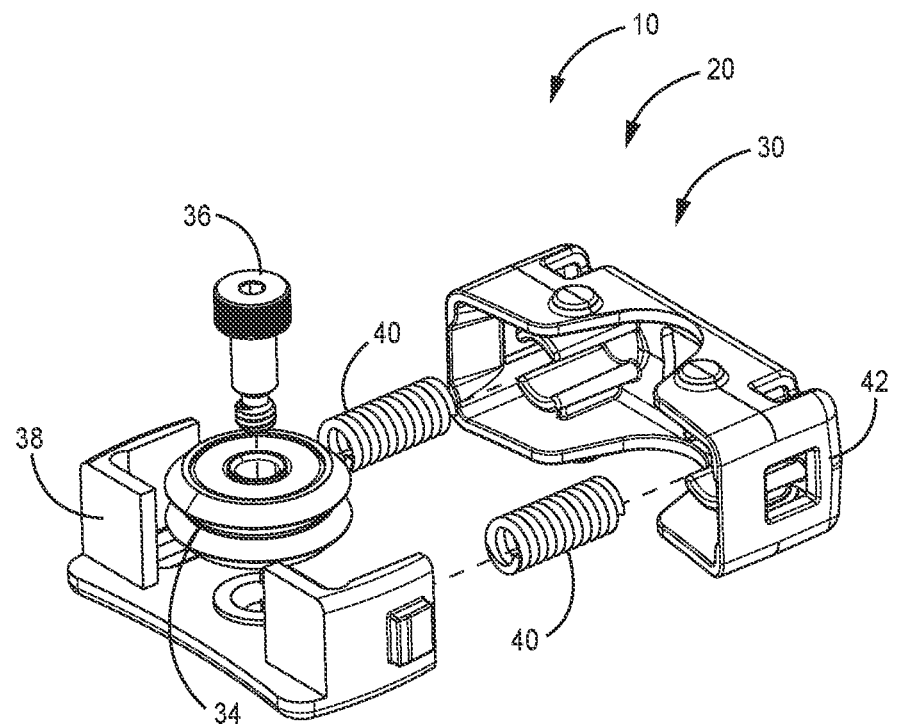
FIG. 7 is an exploded side view of the roller assembly, according to one implementation.
Figure 8:
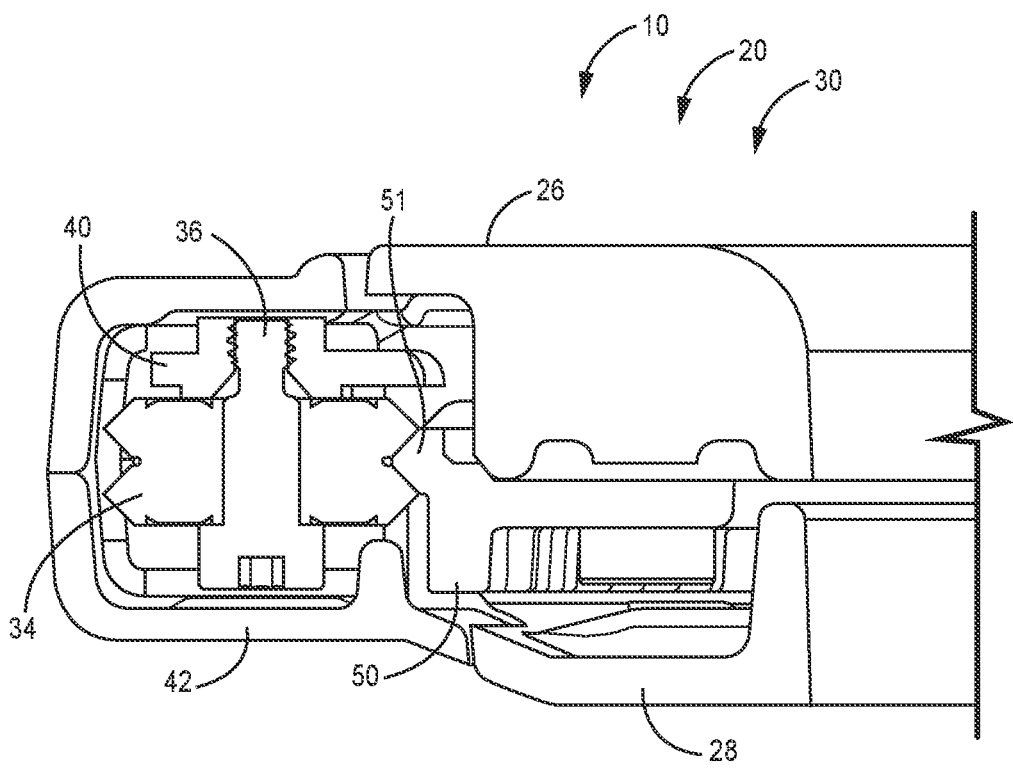
FIG. 8 is a cross sectional view of the roller assembly, according to one implementation.
Figure 9:
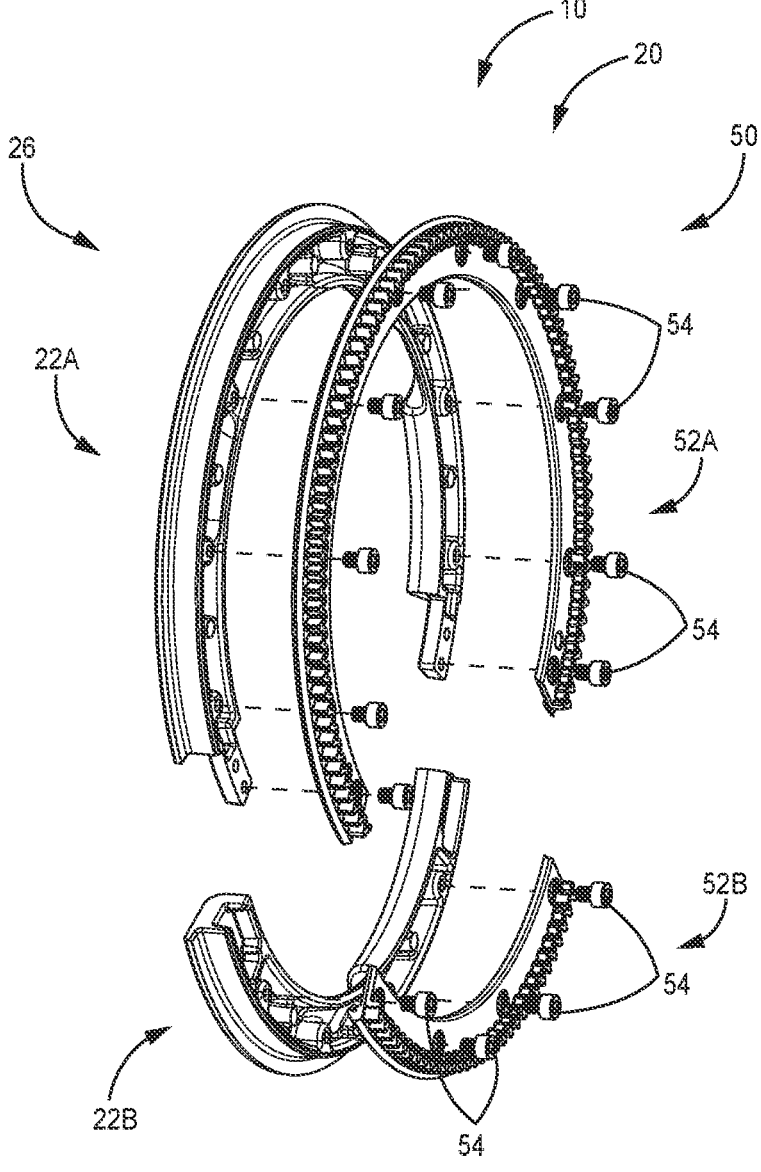
FIG. 9 is an exploded side view of various internal components of the ring assembly, according to one implementation.
Figure 10:
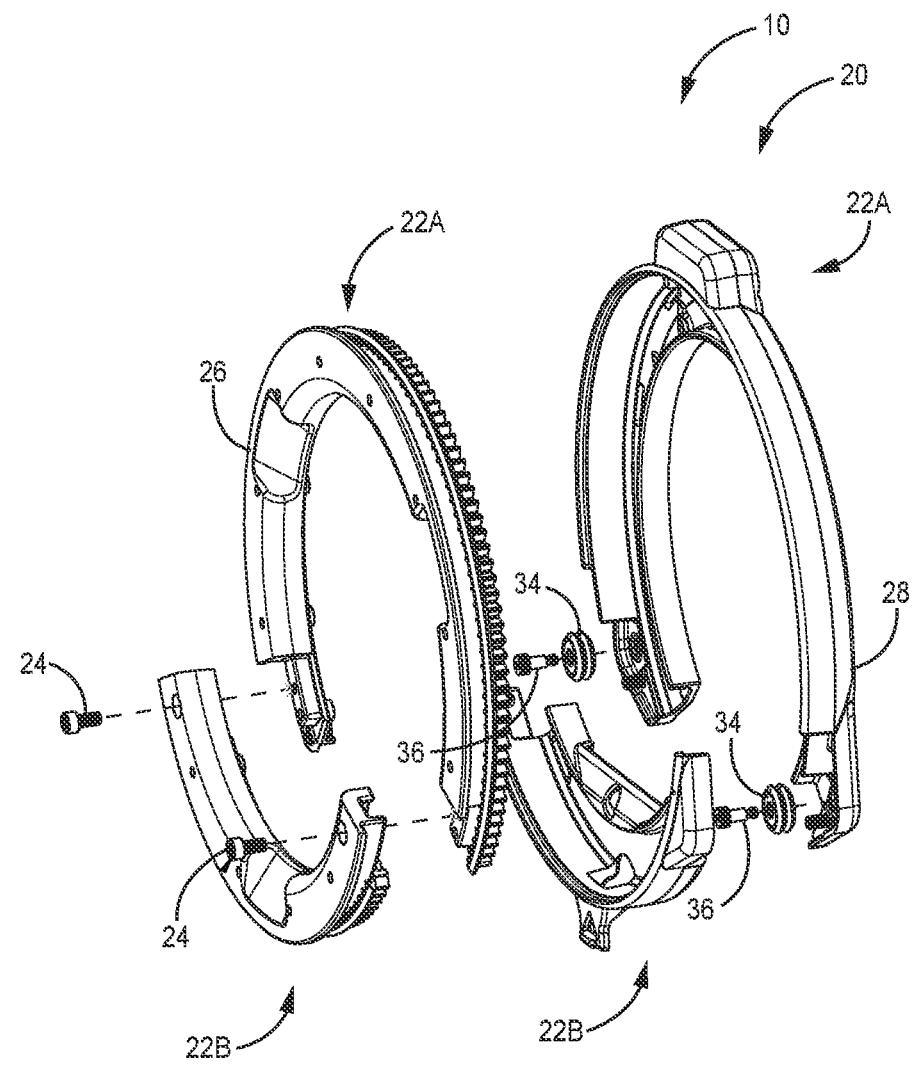
FIG. 10 is an exploded view of the ring assembly, according to one implementation.
Figure 11:
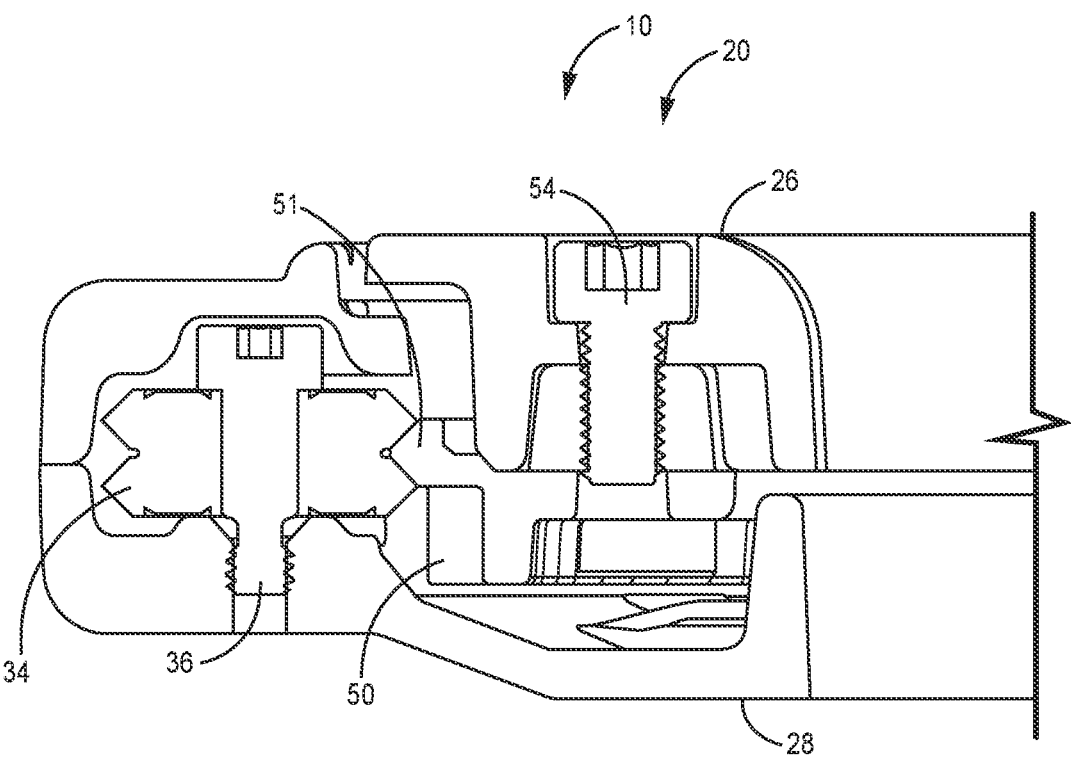
FIG. 11 is a cross sectional view of the ring assembly, according to one implementation.
Figure 12:
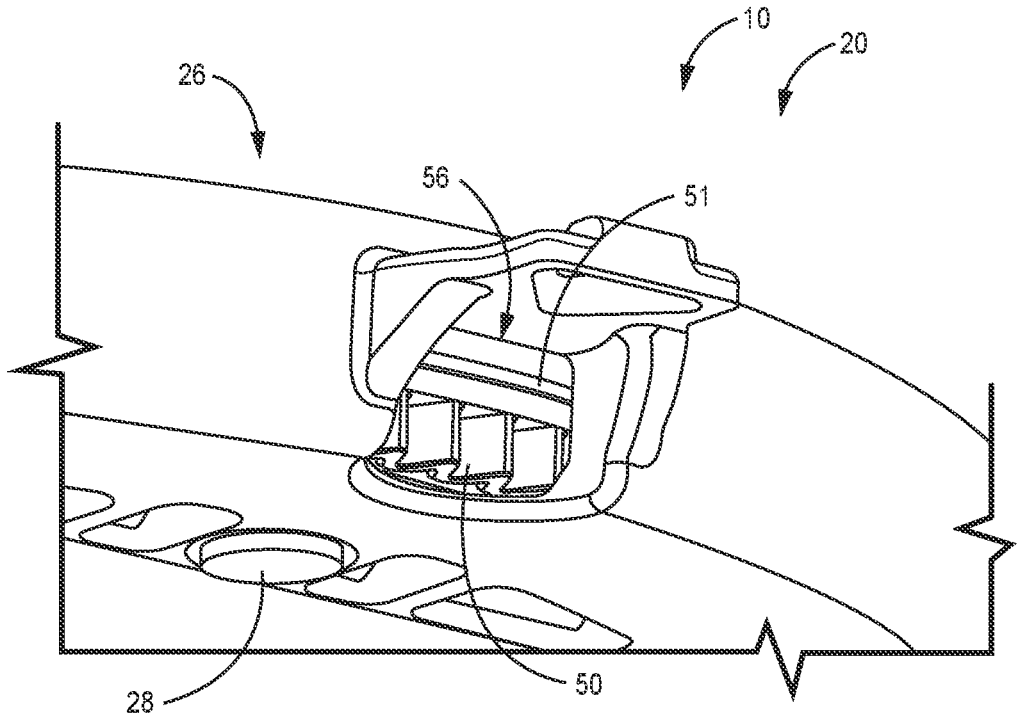
FIG. 12 is a side view of the ring assembly, according to one implementation.
Figure 13:
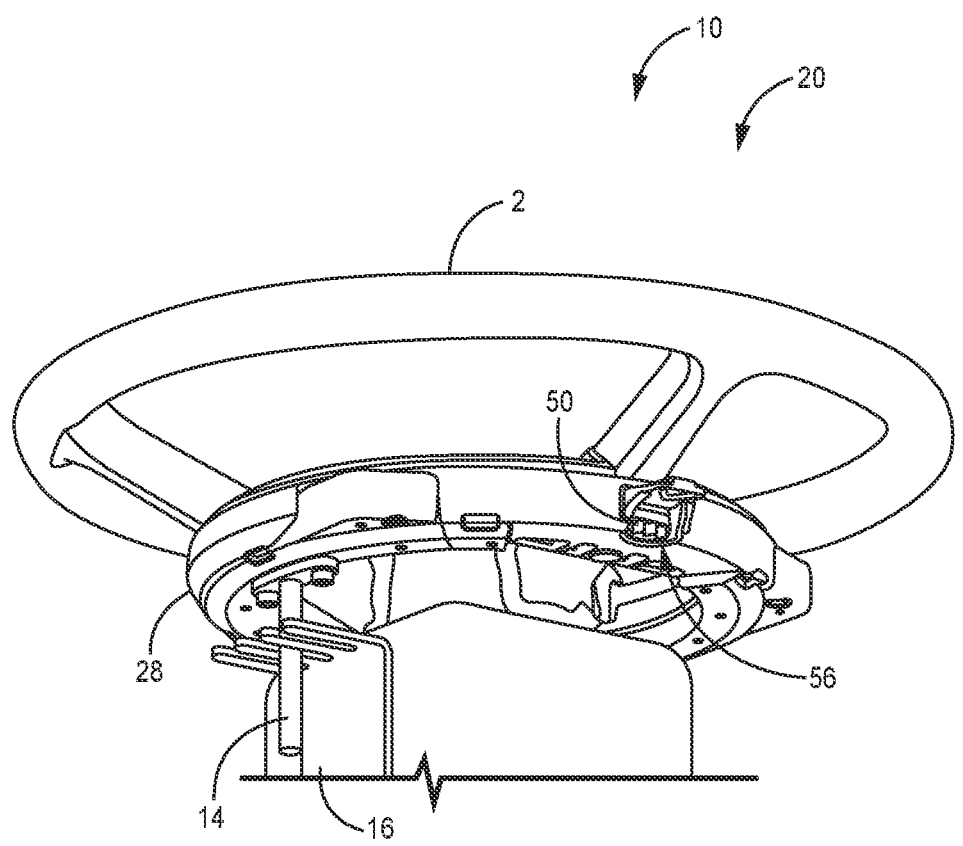
FIG. 13 is a side view of the ring assembly, according to one implementation.

FIGS. 6-13 depict various views of the ring assembly 20 and components thereof: FIG. 6 depicts a side perspective view of the ring assembly 20; FIG. 7 depicts an exploded view of the roller assembly 30; FIG. 8 depicts a cross sectional view of the roller assembly 30; FIG. 9 depicts an exploded side view of various internal components of the ring assembly 20; FIG. 10 depicts an exploded side view of the ring assembly 20; FIG. 11 depicts a cross sectional view of the ring assembly 20; FIG. 12 depicts a side view of the ring gear 50 opening 56; and FIG. 13 shows a side view of the ring assembly 20 with the MDU 60 detached.

In various implementations, and as shown variously in FIGS. 6 and 9-10, the ring assembly 20 includes ring assembly sections 22A, 22B. The ring assembly sections 22A, 22B are shaped to divide the ring assembly 20 into two or more portions, such that the ring assembly 20 can be fitted around a steering column 4, without removal of the steering wheel 2. In certain implementations, the ring assembly sections 22A, 22B may be fitted together and held in place via one or more fasteners 24, such as screws 24. Other fasteners 24 are possible and contemplated herein, as would be understood.

Continuing with FIG. 6, the ring assembly 20 may also include an inner ring 26 and an outer ring 28. In these implementations, the inner ring 26 and outer ring 28 are shaped to be interlocking or otherwise fitted together. In various implementations, the inner ring 26 is constructed and arranged to rotate within the outer ring 28 in response to force applied by the MDU 60, as will be discussed further below. In these implementations, the outer ring 28 remains stationary while the inner ring 26 rotates. The outer ring 28 is held in place by the anti-rotation pin 14, discussed above.

In further implementations, the ring assembly 20 includes a roller assembly 30 (also referred to herein as a cartridge 30) with a cover 32. Shown best in FIGS. 7 and 8, in various implementations, the roller assembly 30 includes a roller 34 and socket 36 to align and guide the rotation of the ring gear 50, discussed further below. In some implementations, the roller 34 and socket 36 are disposed on a carriage 38. In some implementations, various portions of the roller assembly 30 may be encased in a roller sleeve 42 and may also be disposed within a roller cover 32.

The roller assembly 30 may further include one or more springs 40. In various implementations, the springs 40 are constructed and arranged to provide a force to the roller 34 to maintain operational contact between the roller 34 and the ring gear 50. In various implementations, the ring gear 50 and inner ring 26 may not be perfectly circular, often due to manufacturing tolerances, and the springs 40 act to ensure smooth rotation of the ring gear 50 within the device 10 at all times. That is, the cartridge 30 applies pressure to the ring gear 50 and tensions the device 10 such that the ring gear 50 floats within various rollers 34, discussed further below, and does not wobble during rotation.

In various implementations, the roller assembly 30 is located substantially opposite the MDU 60 on the ring assembly 20, as shown in FIG. 6. In these and other implementations, the springs 40 provide force to maintain operational contact between the ring gear 50 and the drive gear (shown in FIG. 14 at 80), counteracting the forces from the torque transfer between the drive gear 80 and the ring gear 50 which may act to force the gear mesh apart.

In some implementations, the roller assembly 30 and springs 40 are manually adjustable. That is, the user may service the roller assembly 30 to adjust the suspension and tension of the opposing gear reduction interface. In certain additional implementations, the cartridge 30 is a modular component of the ring assembly 20 and is field replaceable such that a user may disengage the cartridge 30 from the ring assembly 20 and replace it with a different cartridge 30, shown for example in FIG. 6. In various implementations, the cover 32 is removed from the cartridge 30, the cartridge 30 then can be removed and replaced, and then the cover 32 can be returned.

Turning to the implementations of FIGS. 9-11, the ring assembly 20 further includes an inner ring gear 50. In some implementations, the inner ring gear 50 includes ring gear sections 52A, 52B corresponding to the ring assembly sections 22A, 22B of the overall ring assembly 20, such that the ring assembly 20 can be placed on a steering column 4 without removal of the steering wheel 2. The ring gear 50 may be affixed to the inner ring 26 via a plurality of fasteners 54, such as screws 54. Of course, other fastener 54 types are possible and would be recognized by those of skill in the art.

In some implementations, the ring gear 50 includes a track 51 or groove. The track 51 is shaped to be operatively engaged with the rollers 34 such that ring gear 50 and rollers 34 rotate together and maintain operational contact. In various implementations, the track 51 may be substantially V-shaped. Of course, other shapes are possible.

In various implementations, the ring gear 50 is fully or partially enclosed by the inner ring 26 and outer ring 28. By fully enclosing the ring gear 50, the device 10, according to certain implementations, can be safer to operate and has a cleaner appearance. In various implementations, the ring assembly 20 includes an opening 56 where the ring gear 50 is at least partially exposed, as shown in FIGS. 12 and 13. In these implementations, the MDU may attach to the ring assembly 20 at the opening 56. Further approaches to the attachment of the MDU 60 to the ring assembly 20 are of course possible.

In various implementations, the ring gear 50 may be made by injection molding or any other process known to those of skill in the art for the formation of such components.

The ring assembly 20 may further include one or more additional guide rollers 34 and sockets 36, such as those described above. In certain implementations, these additional guide rollers 34 are disposed at the junction point between the ring assembly sections 22A, 22B of the ring assembly 20.

Figure 14:
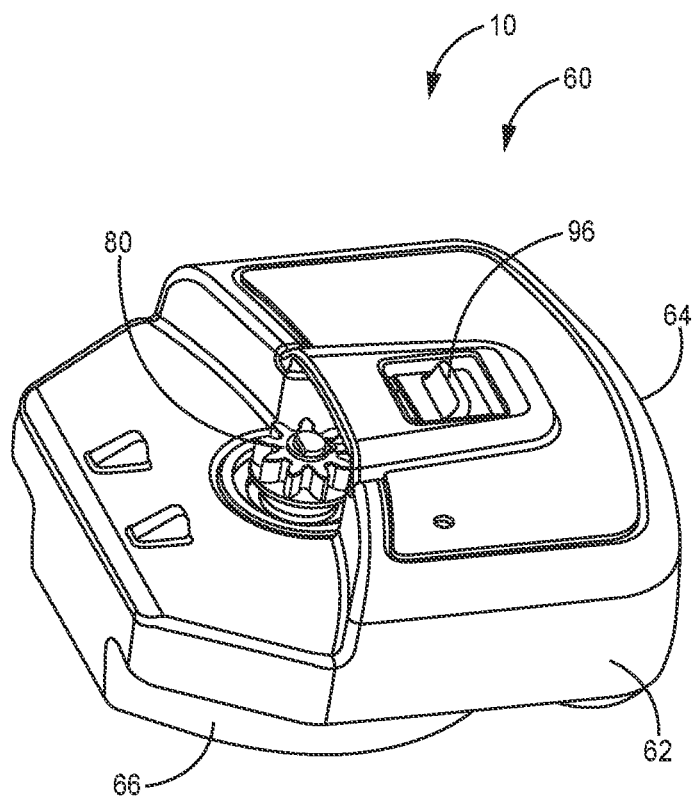
FIG. 14 is a perspective view of the MDU, according to one implementation.
Figure 15:
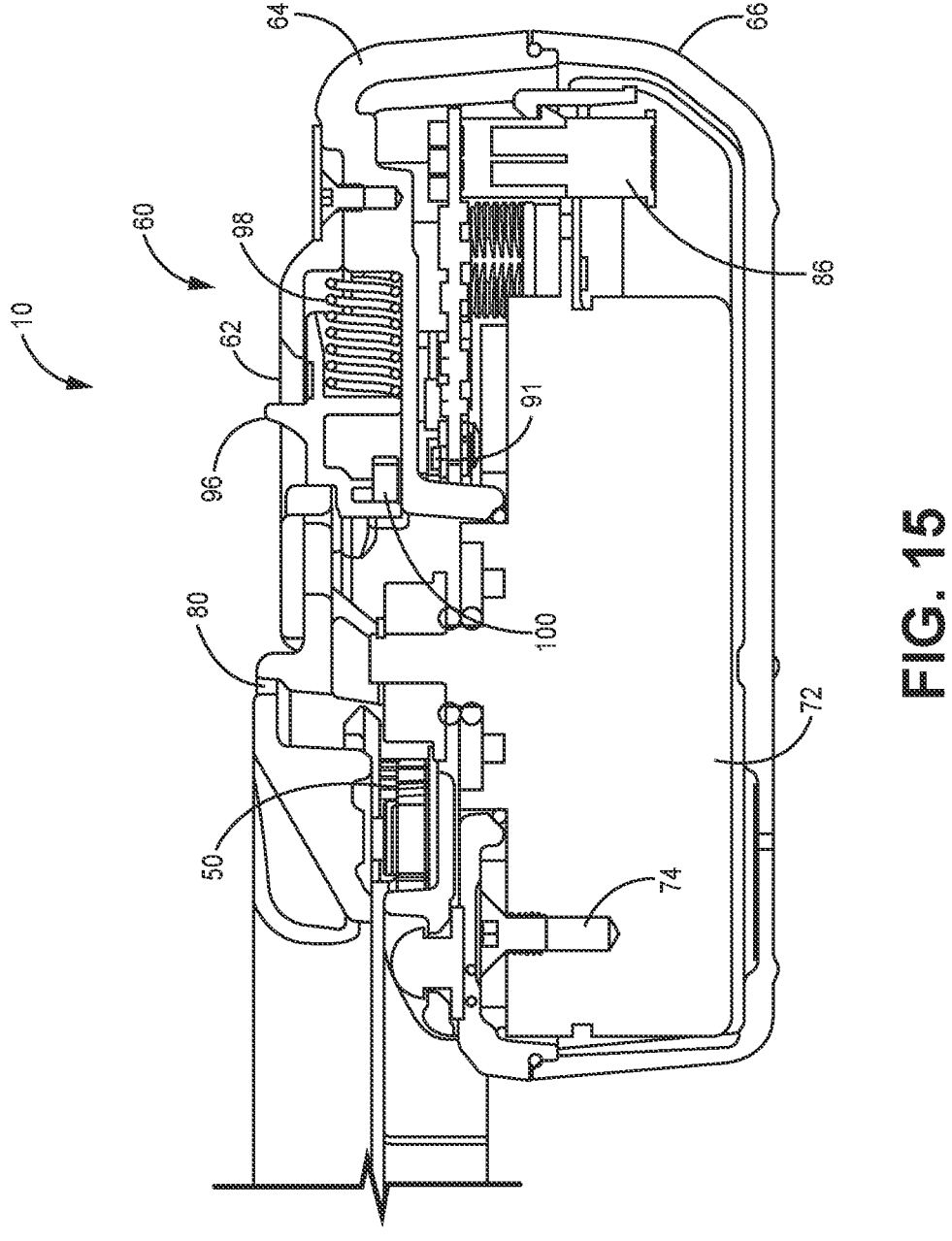
FIG. 15 is a cross sectional view of the MDU, according to one implementation.
Figure 16:
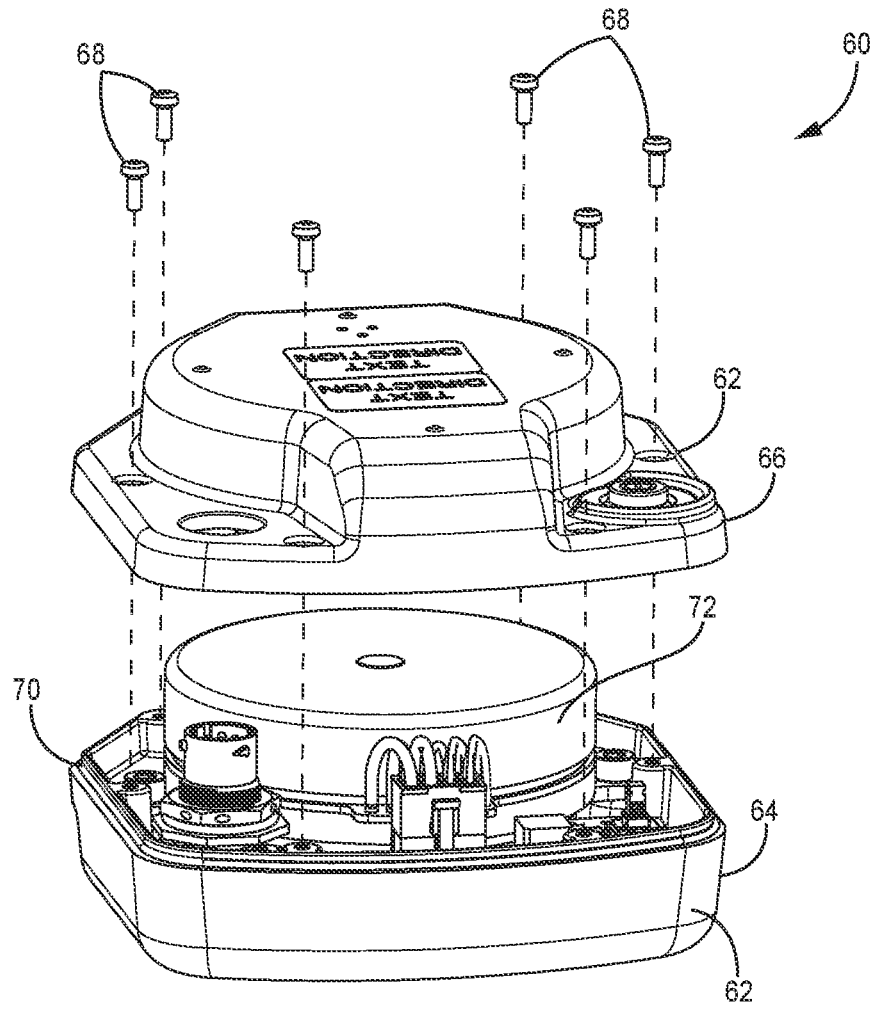
FIG. 16 is an exploded view of the MDU, according to one implementation.
Figure 17:
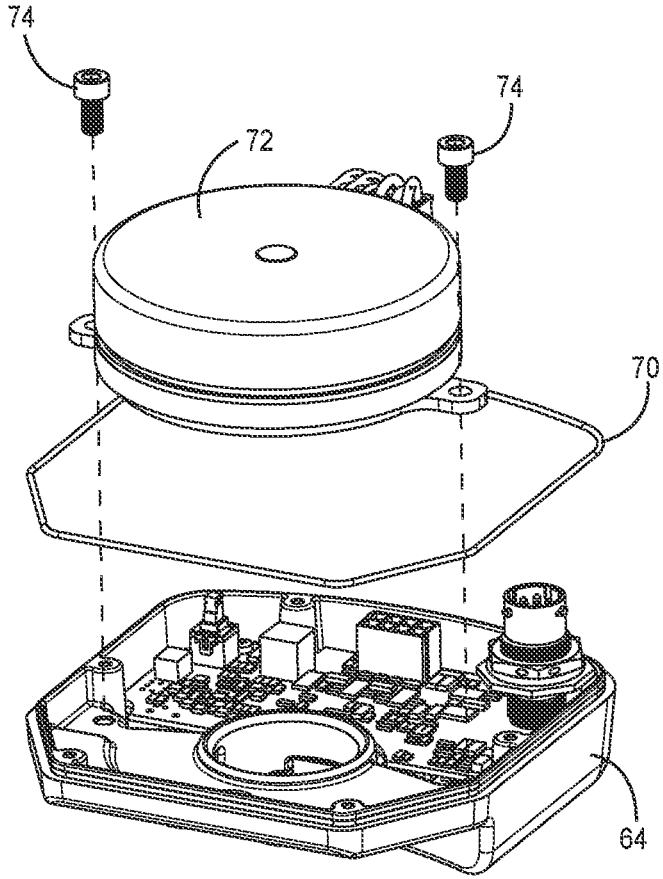
FIG. 17 is an exploded view of the MDU with part of the housing removed, according to one implementation.
Figure 18:
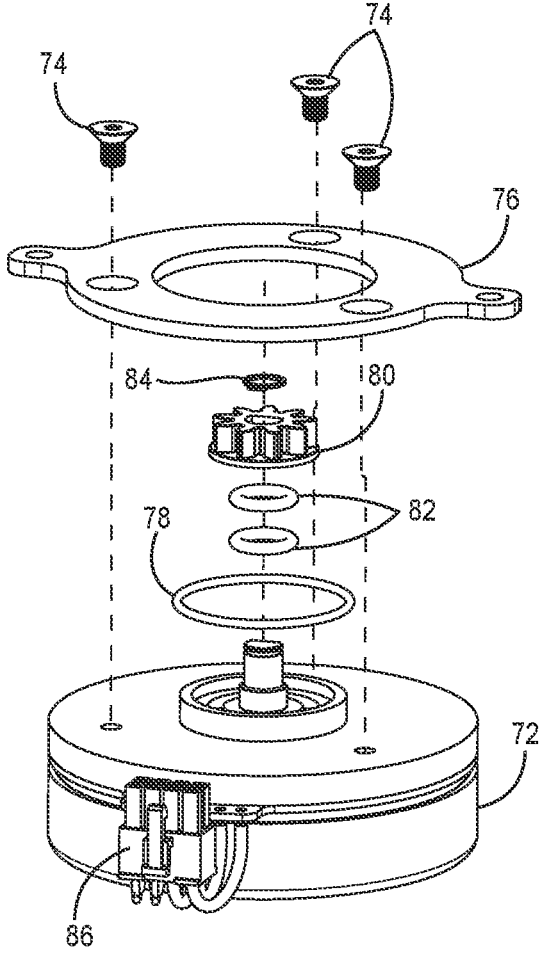
FIG. 18 depicts an exploded view of the motor and drive gear, according to one implementation.
Figure 19:
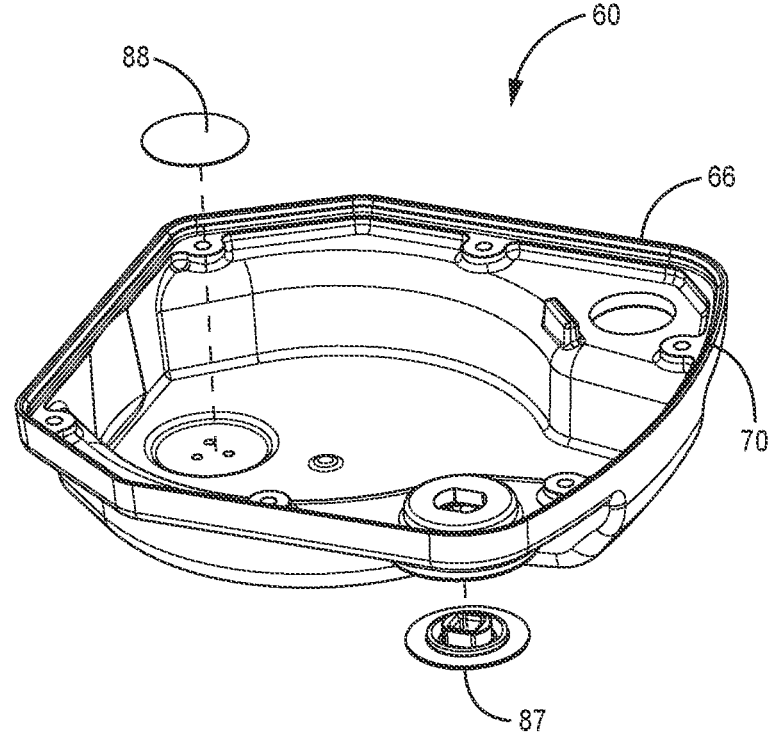
FIG. 19 depicts an exploded view of one side of the housing, according to one implementation.
Figure 20:
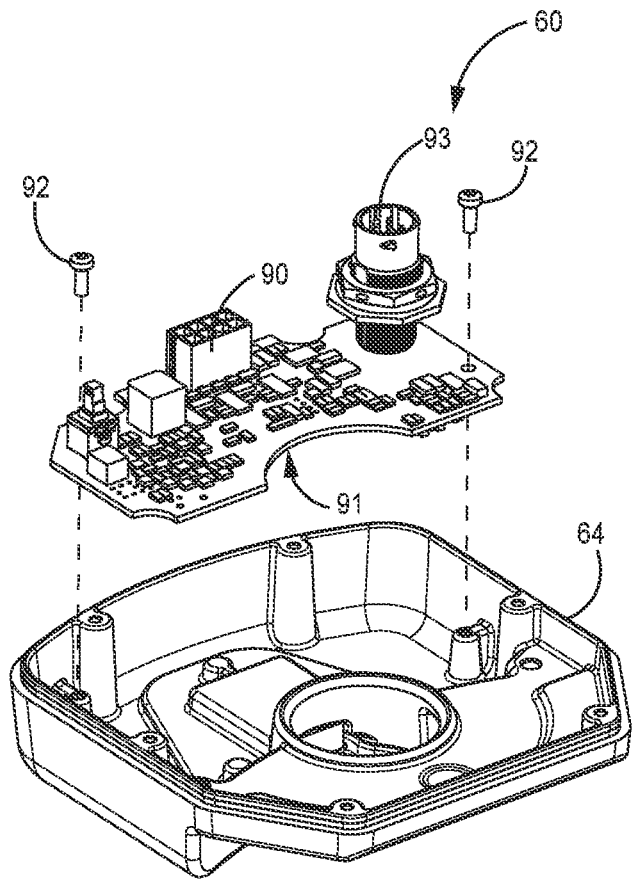
FIG. 20 is an exploded view of the housing and circuit board, according to one implementation.
Figure 22:
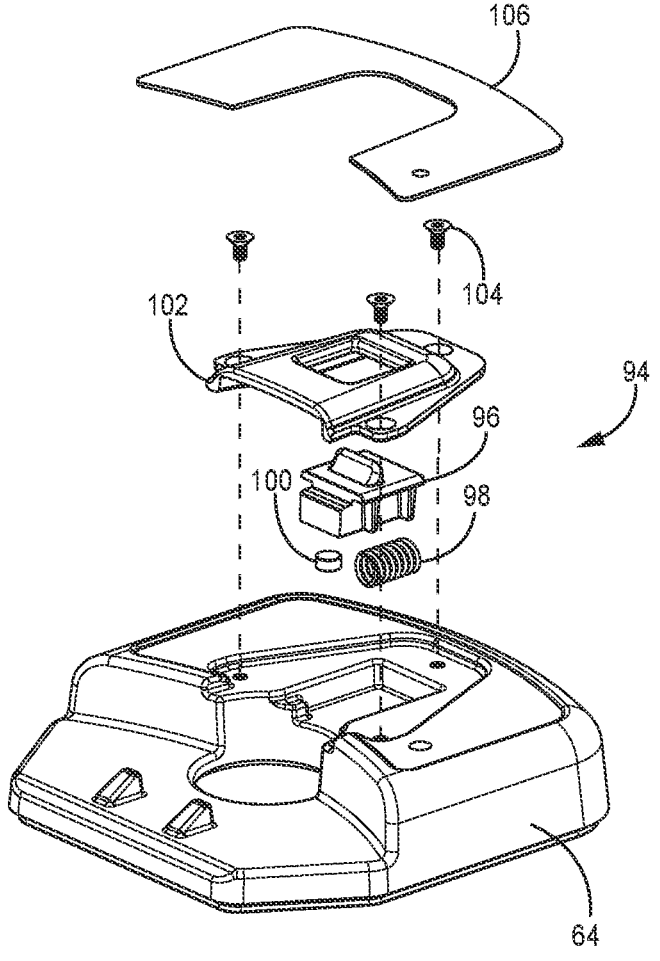
FIG. 22 is an exploded side perspective view of the housing, according to one implementation.

Turning to FIGS. 14-20 and 22 which depict various views and portions of the MDU 60: FIG. 14 depicts a perspective view of the MDU 60; FIG. 15 depicts a cross sectional view of the MDU 60; FIG. 16 depicts and exploded view of the MDU 60; FIG. 17 shows an exploded view of the MDU 60 with the second side 66 removed; FIG. 18 shows the motor 72 and drive gear 80; FIG. 19 shows the second side 66 of the housing 62; FIG. 20 shows the first side 64 of the housing 62 and circuit board 90; and FIG. 22 shows an exploded side perspective view of the first side 64 of the housing 62.

Turning to FIGS. 14-15 in more detail, in various implementations, the MDU 60 includes a housing 62 having and first side 64 and a second side 66. The housing 62 is shaped to enclose various portions of the MDU 60 to provide a safe and easily transportable MDU 60. In some implementations, the drive gear 80 is partially or completely exposed.

The first side 64 and second side 66 may be fitted together via any known mechanism or configuration. In some implementations, the first side 64 and second side 66 are secured together via one or more fasteners 68, as shown in FIG. 16. These fasteners 68 may be screws 68 or any other known fastener 68 type. The housing 62 may further include a gasket 70 or other O-ring 70 type mechanism disposed between the first side 64 and second side 66 to seal the housing 62, shown for example in the implementations of FIGS. 16-17.

In certain implementations, the MDU 60 includes a motor 72 disposed within the housing 62. In some implementations, the motor 72 is a brushless DC "pancake" motor 72 with no internal gear reduction. The brushless DC motor 72 provides for single gear reduction from the drive gear 80 to the ring gear 50. The use of the brushless DC motor 72 may provide for improved torque and speed allowing for overall improved performance. The motor 72 may provide hall-effect sensor outputs for providing "encoder" counts for accurate steering wheel 2 positioning and control.

In various implementations, the motor 72 is attached to the housing 62 via fasteners 74. These fasteners 74 may be screws 74 or any other known fastening mechanism as would be appreciated. In some implementations, the motor 72 is mounted to the first side 64 of the housing 62 via a mounting bracket 76.

Turning to FIG. 18, in certain implementations, the MDU 60 includes an O-ring 78 disposed between the motor 72 and a drive gear 80. Additional O-rings 82 or gaskets 82 may be provided for environmental sealing of the motor 72 through the interface of a drive shaft and support bearing of the motor 72. A retaining ring 84 may be disposed between the drive gear 80 and the housing 62.

In various implementations, the drive gear 80 is shaped to couple the ring gear 50 when the MDU 60 is coupled to the ring assembly 20. In these implementations, motor 72 drives the drive gear 80 which in turn drives the ring gear 50. The ring gear 50 then drives the steering wheel 2 to assist in steering of a vehicle.

In some implementations, the drive gear 80 is field-replaceable. In these and other implementations, the drive gear 80 is visible and accessible when the MDU 60 is disengaged from the ring assembly. In these implementations, the drive gear 80 may be serviced and/or replaced without disassembling the housing 62.

The motor 72 may further include a plug 86 or other type of electrical connection 86 to connect the motor 72 to the circuit board 90, described below.

As shown in FIG. 19, the second side 66 of the housing may include a switch 87 and vent 88. In some implementations, the switch 87 is an on/off switch to turn the MDU 60 and device 10 on or off, as desired. The vent 88 may be configured to allow for the equalization of pressure between the internal pressure in the MDU 60 and the external environment (atmospheric pressure). Further, in some implementations, the vent 88 is configured to prevent water vapor molecules from entering the internal environment of the MDU 60. The vent 88 may be made from a mesh type material such as Gortex® or other appropriate material or materials as would be recognized by those of skill in the art.

The MDU 60 according to certain implementations may further include control processing or electrical components such as a circuit board 90. In these implementations, the circuit board 90 may be affixed to the first side 64 of the housing 62 via one or more fasteners 92. The fasteners 92 may be screws 92 or any other type of fastener 92 as would be appreciated. In various implementations, the circuit board 90 controls the motor 72. In various implementations, a magnetometer 91 is located on the circuit board 90.

In further implementations, the circuit board 90 is in communication with an external unit, such as a processor via an external connector 93 or other recognized mechanism, shown in FIG. 20. Further electronic communications and guidance components such as GPS units may also be in electrical communication with the circuit board 90, as would be readily appreciated. For example, the circuit board may be operably integrated with a field computer, a steering controller, and/or a GPS receiver, such as the SteerCommand® system.

Figure 21:
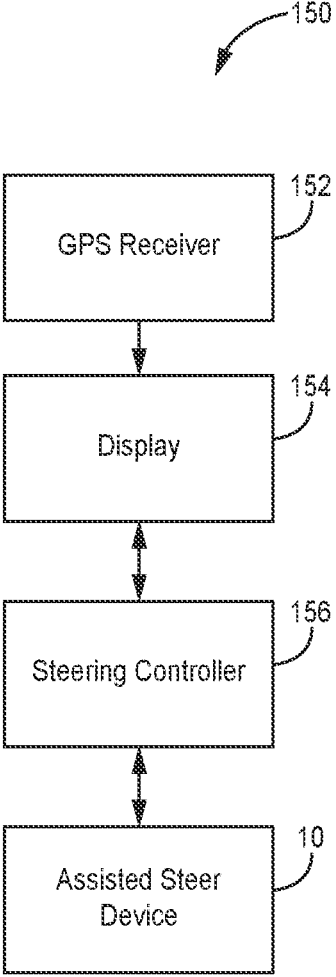
FIG. 21 is a flow diagram of a navigation system, according to one implementation.

In various implementations, the assisted steering device 10 described herein is part of a navigational system 150. In various implementations, the navigation system 150 includes a GPS receiver 152, a display 154, and a steering controller 156, in addition to the assisted steering device 10. Various navigational systems 150 and configurations would be appreciated by those of skill in the art. In one exemplary system 150, shown in FIG. 21, the GPS receiver 152 is located on an agricultural vehicle, such as a harvester. The GPS receiver 152 receives GPS signals related to the real time position of the vehicle. The GPS signal can then be relayed to a display 154. In various implementations, the display 154 is located in the cab such that it can be viewed in real-time by an operator. The display 154 may be capable of calculating, downloading, or otherwise determining desired vehicle paths or guidelines via one or more processors or other computing components as would be understood. The steering controller 156 may receive both the GPS signal information and the desired path information to compare the actual location of the vehicle to the desired location. In some implementations, the steering controller 156 may then send a command to the assisted steer device 10 to steer the implement onto the desired path. In these and other implementations, the vehicle's position on the guidance path is established and maintained by the assisted steering device 10.

In some implementations, the steering controller 156 and the assisted steering device 10 have bi-directional communication whereby the assisted steering device 10 can report its state to the steering controller 156 and the steering controller 156 can send instructions to the assisted steering device 10. In some implementations, the steering controller 156 may in turn report the state of the assisted steering device 10 to the display 154. In one example, the status of the assisted steering device 10 may include fault conditions.

Turning to FIG. 22, which depicts a top view of the first side 64 of the housing 62. In various implementations, the MDU 60 includes a latching mechanism 94. In various implementations, the latching mechanism 94 may include a latch 96, a spring 98 and a magnet 100, also shown in FIG. 15. Continuing with FIG. 22, the latching mechanism 94 may be partially covered or encased by a lid 102. Further, an outer layer 106 may be provided to create a flush or smooth outer surface.

According to various embodiments disclosed or contemplated herein, the device 10 is configured such that a user may determine the mounting state of the MDU 60 on the ring assembly 20 by viewing the position of the latching mechanism 94.

The latching mechanism 94 may function as a safety mechanism by detecting the position of the latch 96 and magnet 100 in relation to the magnetometer 91. In various implementations, the magnetometer 91 may be located on the circuit board 90. In certain implementations, the magnetic field of the magnet 100 is strong enough to pass through the first side 64 of the housing 62 such that the magnetometer 91 may detect the position of the latch without direct contact with the circuit board 90 and/or an opening in the housing 62 that may require further sealing components.

In some implementations, the latching mechanism 94 is constructed and arranged to detect at least three latching positions: (1) MDU 60 not attached, spring 98 is relaxed and latch 96 in extents; (2) MDU 60 attached and secure, spring 98 is partially compressed and latch 96 is in a middle position; (3) MDU 60 attached but not secure, spring 98 is compressed and latch 96 is in opposite extents to the first position. In various implementations, when the MDU 60 is not secure (position 3 above) the latch 96 is not seated to lock the MDU 60 in place on the ring assembly 20, as would be readily appreciated.

In various implementations, the system 10 may include an LED light or other indicator to alert a user when the MDU 60 is not securely attached to the ring assembly 20. In some implementations, this indicator may function at all times when the MDU 60 is not securely attached or in alternative implementations the indicator may only alert an operator when attempting to engaged power to the MDU 60. In this way, the latching mechanism 94 operates as a safety mechanism by disallowing power to the MDU 60, motor 72, and/or motor gear 80 when the MDU 60 is not securely engaged.

Although the disclosure has been described with references to various embodiments, persons skilled in the art will recognized that changes may be made in form and detail without departing from the spirit and scope of this disclosure.

What is claimed is:

1. An assisted steering unit, comprising:
(a) a ring assembly comprising:
 (i) a housing;
 (ii) a stationary ring;
 (iii) a rotatable ring fitted to the stationary ring;
 (iv) a ring gear attached to the rotatable ring disposed within the housing;
 (v) an anti-rotation pin operatively engaged with the housing; and
 (vi) a cartridge comprising at least one spring and a roller configured to maintain operational contact between the ring gear and the roller; and
(b) a motor drive unit (MDU) comprising:
 (i) a motor; and
 (ii) a drive gear rotatably engaged with the motor,
wherein the ring assembly and motor drive unit are constructed and arranged to be releasably engaged to each other.

2. The assisted steering unit of claim 1, wherein the motor is a brushless DC motor.

3. The assisted steering unit of claim 1, further comprising a latching mechanism configured for attachment of the MDU to the ring assembly.

4. The assisted steering unit of claim 1, wherein the housing comprises one or more depressions corresponding to a location of one or more spokes on a steering wheel.

5. The assisted steering unit of claim 1, wherein the drive gear is configured to interface with the ring gear when the MDU is engaged with the ring assembly.

6. The assisted steering unit of claim 1, wherein the ring assembly is divided into two sections for placement around a steering column.

7. The assisted steering unit of claim 1, further comprising a circuit board in communication with the motor configured to control rotation of the drive gear.

8. An assisted steering system comprising:
(a) a first ring unit configured to be operatively engaged with a first steering column of a first vehicle;
(b) a second ring unit configured to be operatively engaged with a second steering column of a second vehicle;
(c) a motor drive unit (MDU) configured to be releasably engaged with the first ring unit and the second ring unit when not engaged with the first ring unit;
(d) a power supply in communication with the MDU; and
(e) a cartridge comprising at least one spring and a roller, wherein the cartridge is configured to maintain operational contact between first ring unit and the MDU,
wherein the MDU controls motion of the first ring unit, and wherein the first ring unit is configured to turn a steering wheel of the first vehicle.

9. The assisted steering system of claim 8, wherein the first ring unit comprises:
(a) a stationary ring;
(b) a rotatable ring fitted to the stationary ring; and
(c) a ring gear attached to the rotatable ring, wherein the stationary ring and the rotatable ring form a housing for the ring gear.

10. The assisted steering system of claim 9, wherein the MDU comprises:
(a) a motor; and
(b) a drive gear driven by the motor, the drive gear configured to be engaged with the ring gear when the MDU is engaged with the first ring unit.

11. The assisted steering system of claim 10, wherein the cartridge is configured to maintain operational contact between the ring gear and the drive gear.

12. The assisted steering system of claim 11, wherein the cartridge is modular and field replaceable.

13. An assisted steering system comprising:
(a) a first ring unit configured to be operatively engaged with a first steering column of a first vehicle, the first ring unit comprising:
 (i) a stationary ring;
 (ii) a rotatable ring fitted to the stationary ring;
 (iii) a ring gear attached to the rotatable ring, wherein the stationary ring and the rotatable ring form a housing for the ring gear; and
 (iv) a cartridge comprising at least one spring and a roller configured to maintain operational contact between the ring gear and the roller;
(b) a motor drive unit (MDU) configured to be releasably engaged with the first ring unit; and
(c) a power supply in communication with the MDU,
wherein the MDU controls motion of the first ring unit, and wherein the first ring unit is configured to turn a steering wheel of the first vehicle.

14. The assisted steering system of claim 13, wherein the cartridge is modular.

15. The system of claim 13, further comprising an anti-rotation pin engaged with the stationary ring and configured to be attached to a steering column.

16. The system of claim 15, further comprising a bracket configured to be disposed on the steering column for engaging with the anti-rotation pin.

17. The system of claim 13, further comprising a sensor within the motor drive unit for sensing rotation of the drive gear, the ring gear, and a steering wheel.

18. The system of claim 13, further comprising a power adaptor for providing power to the motor drive unit.

19. The system of claim 13, wherein the cartridge further comprises a socket.

20. The system of claim 13, wherein the ring gear is configured to float within the roller.

\*   \*   \*   \*   \*